US011810033B2

(12) United States Patent
Tian et al.

(10) Patent No.: US 11,810,033 B2
(45) Date of Patent: Nov. 7, 2023

(54) COMPUTER IMPLEMENTED METHODS AND SYSTEMS FOR PROJECT MANAGEMENT

(71) Applicants: Atlassian Pty Ltd., Sydney (AU); Atlassian Inc., San Francisco, CA (US)

(72) Inventors: Shuchen Tian, Carseldine (AU); Henry Su, Sydney (AU); Daniel Craig Annesley, Sydney (AU); Amy Elizabeth Connell, Sydney (AU); Albert Kavelar, Sydney (AU)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 17/488,945

(22) Filed: Sep. 29, 2021

(65) Prior Publication Data
US 2023/0093879 A1  Mar. 30, 2023

(51) Int. Cl.
*G06Q 10/0631* (2023.01)
*G06F 3/0486* (2013.01)
(Continued)

(52) U.S. Cl.
CPC . *G06Q 10/063118* (2013.01); *G01C 21/3664* (2013.01); *G06F 3/0486* (2013.01);
(Continued)

(58) Field of Classification Search
CPC .......... G06Q 10/063118; G06Q 10/06; G06Q 10/063112; G06Q 10/063116;
(Continued)

(56) References Cited

U.S. PATENT DOCUMENTS

| 6,047,260 A * | 4/2000 | Levinson ....... G06Q 10/063114 705/7.15 |
| 6,310,886 B1 * | 10/2001 | Barton ................... H04L 12/66 370/443 |

(Continued)

FOREIGN PATENT DOCUMENTS

| EP | 3671448 A1 * | 6/2020 | ............. G06F 1/329 |
| WO | WO-2022223109 A1 * | 10/2022 | |

OTHER PUBLICATIONS

S. Luz, M. Masoodian, D. McKenzie and W. V. Broeck, "Chronos: A Tool for Interactive Scheduling and Visualisation of Task Hierarchies," 2009 13th International Conference Information Visualisation, 2009, pp. 241-246, doi: 10.1109/IV.2009.88. (Year: 2009).*

(Continued)

*Primary Examiner* — Crystol Stewart
(74) *Attorney, Agent, or Firm* — Brownstein Hyatt Farber Schreck, LLP

(57) ABSTRACT

Described herein is a computer implemented method. The method comprises receiving, from a server application, project data defining a plurality of tasks and a plurality of iterations, each iteration having a start time and an end time and displaying, on a display, a timeline graphical user interface including a plurality of task timelines, each task timeline corresponding to one of the plurality of tasks. The method further comprises detecting a first user input, the first user input associated with a particular task and, in response to detecting the first user input, displaying a plurality of available drop zones in the particular task's timeline, each available drop zone corresponding to an available iteration, an available iteration being an iteration that the particular task can be assigned to.

20 Claims, 16 Drawing Sheets

(51) Int. Cl.
*G09G 5/00* (2006.01)
*G01C 21/36* (2006.01)
*G06Q 10/06* (2023.01)
*G06Q 10/10* (2023.01)
*G06F 3/04817* (2022.01)
*G06F 3/04842* (2022.01)
*G06Q 10/109* (2023.01)

(52) U.S. Cl.
CPC ...... *G06F 3/04817* (2013.01); *G06F 3/04842* (2013.01); *G06Q 10/06* (2013.01); *G06Q 10/063112* (2013.01); *G06Q 10/063116* (2013.01); *G06Q 10/103* (2013.01); *G06Q 10/109* (2013.01); *G09G 5/006* (2013.01); *G06F 2206/1008* (2013.01); *G08C 2201/30* (2013.01); *G09G 2354/00* (2013.01)

(58) Field of Classification Search
CPC ............... G06Q 10/103; G06Q 10/109; G01C 21/3664; G06F 3/0486; G06F 2206/1008; G06F 3/04817; G06F 3/04842; G09G 5/006; G09G 2354/00; G08C 2201/30
See application file for complete search history.

(56) References Cited

U.S. PATENT DOCUMENTS

| | | | | |
|---|---|---|---|---|
| 2003/0066032 A1* | 4/2003 | Ramachandran | ..... | G06F 3/0486 715/234 |
| 2006/0069604 A1* | 3/2006 | Leukart | ............... | G06Q 10/109 715/792 |
| 2006/0238538 A1* | 10/2006 | Kapler | ................... | G06Q 10/06 345/440 |
| 2007/0075747 A1* | 4/2007 | Apelbaum | .......... | G06F 11/1482 327/20 |
| 2007/0219842 A1* | 9/2007 | Bansal | ................... | G06Q 10/06 715/810 |
| 2010/0083134 A1* | 4/2010 | Gnech | ................. | G06Q 10/109 715/753 |
| 2011/0167367 A1* | 7/2011 | Sharma | ................. | G06F 3/0481 715/765 |
| 2012/0265570 A1* | 10/2012 | Hegazi | ............... | G06Q 10/0631 705/7.12 |
| 2015/0134386 A1* | 5/2015 | Jogalekar | ....... | G06Q 10/063118 705/7.13 |
| 2015/0262396 A1* | 9/2015 | Devarajan | ............. | G06F 3/0486 345/440.1 |
| 2017/0068932 A1* | 3/2017 | Leary | .................. | G06Q 10/103 |
| 2019/0018658 A1* | 1/2019 | Martello | ................ | G06F 16/00 |
| 2019/0130330 A1* | 5/2019 | Slagle | ............ | G06Q 10/063114 |
| 2020/0279014 A1* | 9/2020 | Lenzner | ................ | G06F 40/106 |
| 2021/0365859 A1* | 11/2021 | Prescott | ........... | G06Q 10/06314 |

OTHER PUBLICATIONS

J. Xing, H. Zhao, P. Jiang, H. Zhu and X. Zou, "A timeline visualization framework for task scheduling," 2017 4th International Conference on Control, Decision and Information Technologies (CoDIT), Barcelona, Spain, 2017, pp. 1162-1167, doi: 10.1109/CoDIT.2017.8102757. (Year: 2017).*

* cited by examiner

COMPUTER IMPLEMENTED METHODS AND SYSTEMS FOR PROJECT MANAGEMENT

FIELD

The present disclosure is directed to computer implemented methods and systems for project management.

BACKGROUND

Various computer implemented project management tools exist. At a very general level, such tools are used to assist in planning and executing projects. Using a networked computer system, a graphical user interface can be used to track and manage a number of projects in a given display area or interface. However, as the number of projects being tracked increase or project complexity increases, visualization of a management of multiple project timelines in a given user interface can become difficult using traditional visualization and user interface techniques.

SUMMARY

Example embodiments described herein are directed to a computer implemented method comprising: receiving, from a server application, project data defining a plurality of tasks and a plurality of iterations, each iteration having a start time and an end time; displaying, on a display, a timeline graphical user interface including a plurality of task timelines, each task timeline corresponding to one of the plurality of tasks; detecting a first user input, the first user input associated with a particular task; and in response to detecting the first user input, displaying a plurality of available drop zones in the particular task's timeline, each available drop zone corresponding to an available iteration, an available iteration being an iteration that the particular task can be assigned to.

Figure 1:
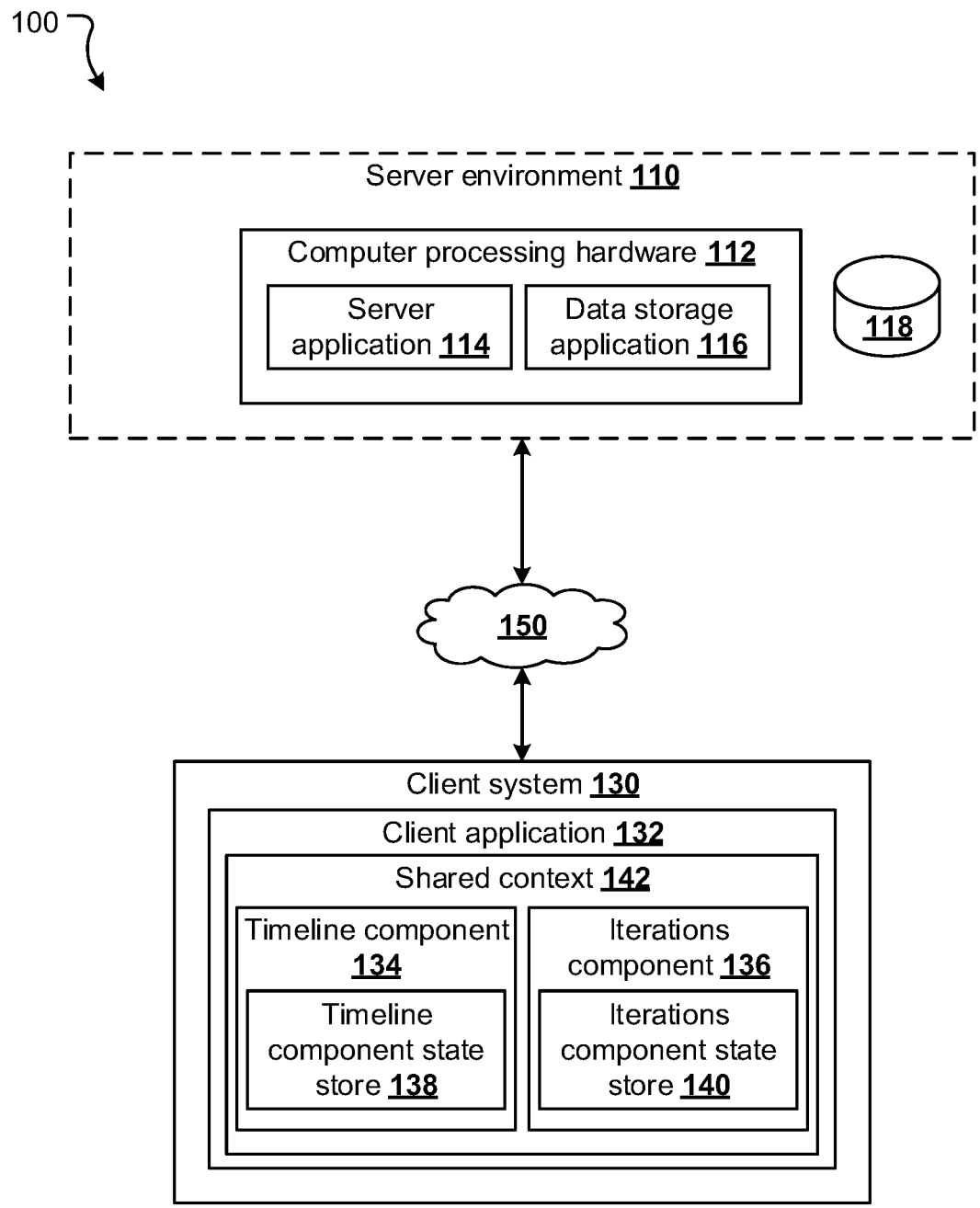
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Various project management methodologies exist. One such methodology (or group of methodologies) is agile project management, specific examples of which include scrum, Kanban, scrum ban, and other known agile methodologies.

To provide a general example, agile methodologies typically involve dividing a given project up into relatively high-level tasks (often referred to as epics) and further dividing those tasks into sub-tasks (often referred to as stories). The sub-tasks are then assigned to teams which work in scheduled work iterations of defined lengths (often referred to as sprints). In agile methodologies, a given task will ideally occupy a single work iteration and not span multiple iterations.

When planning a project, these work iterations (e.g., sprints) effectively provide an additional time dimension to task scheduling. This is in the sense that it is not only time as an absolute that is relevant (e.g., that a task is scheduled to be completed in the month of June) but also when work iterations are scheduled within the time period (e.g., available sprints are 1-5 June, 8-12 June, etc.). While these work iterations are useful from a project planning and management perspective, they can complicate the process of assigning tasks to teams and/or visualising such assignments.

The present disclosure is generally directed to computer implemented methods and systems that assist in both visualising available iterations and in assigning tasks to iterations. The techniques and features described herein may be used with (or be adapted to be used with) any appropriate project management tool. One example of such a tool is Jira made available by Atlassian.

Figure 3:
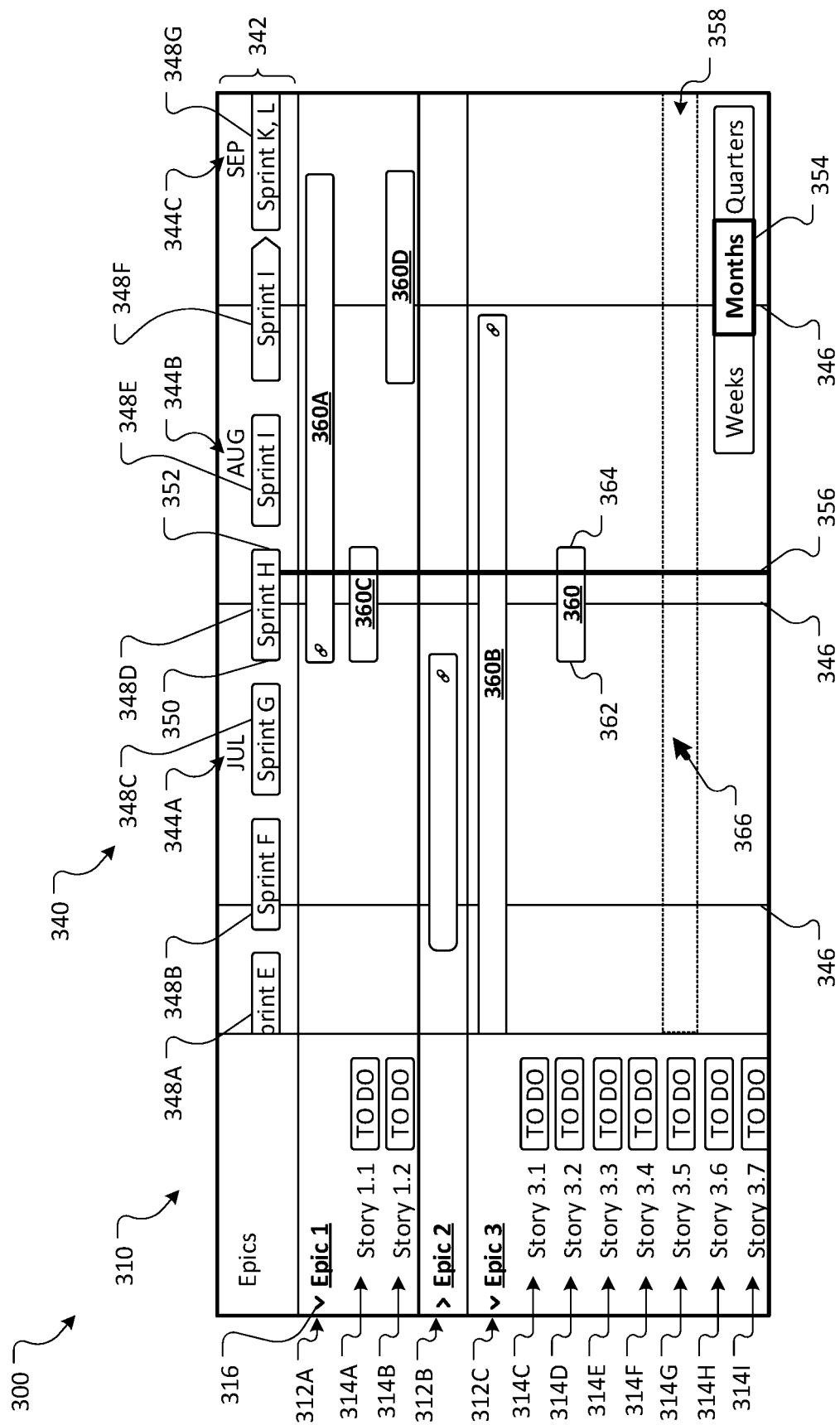
FIG. 3 depicts an example timeline graphical user interface.

In particular, the present disclosure provides mechanisms for visualising iterations and for assigning tasks to iterations within a timeline-type graphical user interface (GUI)—for example a timeline interface such as GUI 300 of FIG. 3. This provides users with an intuitive means of visualising how the available time is divided into iterations. It also allows users to assign tasks to iterations within a timeline interface—e.g., without having break context by navigating to an alternative user interface to make such task assignments.

Furthermore, the disclosure describes what are referred to as multi-component embodiments: that is, embodiments in which the timeline user interface is generated by a separate component to the component that handles iteration assignment. In certain circumstances, decoupling the two areas of concern advantageously provides more flexibility to other consumers of the components. For example, another consumer of the underlying timeline component is not forced to adopt the iterations component (and features provided by that component). Further, keeping the two components decoupled simplifies testing in the sense that each component can be separately tested.

Generally speaking, a project management tool will allow (inter alia) users to create projects, define tasks associated with a project (e.g., stories, epics, initiatives, and/or other tasks), assign resources to tasks (e.g., individuals, teams, and/or other resources), and schedule tasks over time (e.g., set start and/or end dates for tasks).

As used herein, a task is any task or set of tasks that forms part of a project. By way of example, in agile methodologies (initially used for software development but increasingly being used for other, non-software development projects) large projects are typically broken up into epics. Epics, in turn, are broken up into stories (the basic task for a project). Depending on the size and scope of a project, multiple epics may be grouped into an initiative (the project having one or more initiatives).

In the present context, therefore, stories, epics (groups of related stories), and initiatives (groups of related epics) are different types of project tasks.

Alternative project management methodologies may have alternatively named tasks. Further, some project management tools provide mechanisms for users to create their own tasks—e.g., projects, tasks, sub-tasks and/or any other named tasks. The relevant factor, again, is that a task is a task or set of tasks that form part of a project.

Often, as is the case in agile methodology, task types will be hierarchical. For example, a project (the top or level 1 of the hierarchy) may be made up of one or more initiatives (level 2 of the hierarchy), each initiative may be made up of one or more epics (level 3 of the hierarchy), and each epic may be made up of one or more stories (level 4 of the hierarchy). A hierarchy of task types, however, is not required.

In the present embodiments, tasks are defined by task data. The specific task data stored, and the manner in which it is stored, will depend on the project management tool in question. By way of example, however, task data may include a task record for each task of a project. The data for a given task record may define attributes for that task such as the following:

| Task attribute | Note |
| --- | --- |
| Project ID | A value identifying a project the task belongs to. |
| Task ID | A value uniquely identifying the task (or, at least uniquely identifying the task within the project the task is associated with). |
| Task type | A value identifying a type of the task (e.g., an initiative, an epic, a story, or another task type relevant to the project). |
| Creator ID | A value (e.g., a user ID) identifying a creator of the task. |
| Creation date | A value (e.g., a timestamp) indicating the date the task was created. |
| Title | A value (e.g., a string) providing a short title for the task. |
| Description | A value (e.g., a string) providing a more detailed description of the task. |
| Assignee | A value identifying a user or team the task has been assigned to. |

Additional and/or alternative task attributes may be provided/allowed for. For example, task data may also (or alternatively) include (or otherwise be associated with) attributes data such as: a task complexity measure (for example story points or an alternative measure providing an indication of complex the task is/how much effort is required to complete the task); skill data (providing an indication of what skills are required to complete the task); and/or other task data.

As used herein, an iteration is a scheduled time period in which a team performs work. In the context of software development, iterations are typically referred to as sprints. Iteration durations are typically short, for example, 1 to 4 weeks, though can be shorter/longer. A common iteration duration is 2 weeks. A given team can have iterations of different durations, different teams can have iterations of different durations compared to one another, and/or the iterations of the teams may start at different times. For example, a first team may work in weeklong sprints that start on the Monday of each week, while a second team may have fortnightly sprints that start on the Wednesday of each fortnight.

Iterations relevant to a project are defined by iteration data. The specific iteration data stored, and the manner in which it is stored, will depend on the project management tool in question. By way of example, however, iteration data may include an iteration record for each iteration of a project. The data for a given iteration record may define attributes for that iteration such as the following:

| Iteration attribute | Note |
| --- | --- |
| Iteration ID | A value identifying the iteration. |
| Iteration start | A timestamp indicating the start date of the iteration. |
| Iteration end | A timestamp indicating the start date of the iteration. (Instead of storing an iteration end, an iteration duration may instead be stored from which the iteration end can be calculated). |
| Iteration state | A value indicating a state of the iteration- e.g., whether the iteration is open (available) or closed (unavailable). |

In some embodiments, task data and iteration data are maintained in tables of a relational database, those table linked by appropriate keys. In this example, tasks are assigned to iterations by creating a record in a task-iteration table which associates task identifiers to iteration identifiers—e.g.:

| Task-Iteration attribute | Note |
| --- | --- |
| TaskId | A task identifier |
| Iteration ID | A set (e.g., an array or other set) of iteration identifiers which identify the iteration(s) that the task has been assigned to |

In this example a single task identifier may be associated with multiple iteration identifiers. Further fields/attributes may be defined, for example a unique record identifier, an assignment date, and/or other fields. Furthermore, tasks may be associated with (assigned to) iterations in alternative ways.

As noted, the various features described herein are implemented within the context of a project management tool. In the described embodiments, the project management tool is implemented in a client-server architecture in which functionality is provided by the coordination of client and server applications.

FIG. 1 depicts one example of a networked environment 100 in which the operations and techniques described herein can be performed. Networked environment 100 includes a server environment 110 and a client system 130 which communicate via one or more communications networks 150 (e.g., the Internet).

Generally speaking, the server environment 110 includes computer processing hardware 112 (discussed below) on which applications that provide server-side functionality to client applications (such as client application 132, described below) execute. In the present example, server environment 110 includes a server application 114 (which may also be referred to as a front-end server application) and a data storage application 116.

The server application 114 executes to provide a client application endpoint that is accessible over communications network 150. To do so, the server application 114 may include one or more application programs, libraries, application programming interfaces (APIs) or other software elements that implement the features and functions that are described herein. In the embodiments described herein, server application 114 serves web browser client applications. In this case server application 114 is a web server which receives and responds to, for example, hypertext transfer protocol (HTTP) application requests. In alternative embodiments, server application 114 may serve native client applications—in which case server application 114 will be an application server configured to receive, process, and respond to API calls from those client applications The server environment 110 may include both web server and application server applications allowing it to interact with both web and native client applications.

Server application 114 (and/or other applications running in the server environment 110) can be implemented as a monolithic application. Alternatively, server application 114 can be implemented as a collection of independent and autonomous application services (e.g., microservices). In this case, the constituent application services of server application 114 communicate amongst themselves, with other front end server applications 114, and/or with client applications 132, via defined interfaces such as web APIs.

In addition to the specific functionality described herein, the server application 114 (alone or in conjunction with other applications) may provide additional functions that are typically provided by a project management server system. These functions may include, for example: user account creation and management; user authentication; functions for creating, editing, and managing projects; functions for creating, editing, and managing teams; functions for creating, editing, and managing tasks; functions for defining iterations; other functions that are relevant to a project management tool/platform.

The data storage application 116 executes to receive and process requests to persistently store and retrieve data that is relevant to the operations performed/services provided by the server environment 110. Such requests may be received from the server application 114, other server environment applications, and/or (in some instances) directly from client applications such as 132. Data relevant to the operations performed/services provided by the server environment may include, for example, user account data, project data (describing projects that have been created by and are being managed using the project management tool), team data (describing teams and their members), task data (e.g., as described above), iteration data (e.g., as described above), task-iteration data, and/or other data relevant to the operation of the server application 114.

The data storage application 116 may, for example, be a relational database management application or an alternative application for storing and retrieving data from data storage 118. Data storage application 116 stores data to and retrieves data from one or more non transient (or persistent) data storage devices 118—e.g., on-transient computer readable storage devices such as hard disks, solid state drives, tape drives, or alternative computer readable storage devices.

In server environment 110, server application 114 persistently stores data to data storage device 118 via the data storage application 116. In alternative implementations, however, the server application 114 may be configured to directly interact with data storage devices such as 118 to store and retrieve data (in which case a separate data storage application may not be needed). Furthermore, while a single data storage application 116 is described, server environment 110 may include multiple data storage applications. In this case, each data storage application may interface with one or more shared data storage devices 118 and/or one or more dedicated data storage devices 118, and each data storage application may receive and/or respond to requests from various server-side and/or client-side applications (including, for example, server application 114).

As noted, the server application 114 and data storage application 116 run on (or are executed by) computer processing hardware 112. Computer processing hardware 112 includes one or more computer processing systems. The precise number and nature of those systems will depend on the architecture of the server environment 110.

For example, in one implementation a single server application 114 runs on its own computer processing system and a single data storage application 116 runs on a separate computer processing system. In another implementation, a single server application 114 and a single data storage application 116 run on a common computer processing system. In yet another implementation, server environment 110 may include multiple server applications running in parallel (on one or more computer processing systems).

In a further implementation, server environment 110 is a scalable environment in which application instances (and the computer processing hardware 112—e.g., the specific computer processing systems required to run those instances) are commissioned and decommissioned according to demand—e.g., in a public or private cloud-type system. In this case, server environment 110 may simultaneously run multiple server applications 114 and/or multiple data storage applications 116 (on one or more computer processing systems) as required by client demand. Where server environment 110 is a scalable system it will include additional applications to those illustrated and described. As one example, the server environment 110 may include a load balancing application which operates to determine demand, direct client traffic to the appropriate server application instance 114 (where multiple server applications 114 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

As a further example, where an application (e.g., server application 114) is implemented as a collection of application services, each application service may run on its own computer processing system or multiple application services may run on a common computer processing system.

Communication between the applications (and/or application services) and computer processing systems of the server environment 110 may be by any appropriate means, for example, direct communication or networked communication over one or more local area networks, wide area networks, and/or public networks (with a secure logical overlay, such as a VPN, if required).

The present disclosure describes various operations that are performed by applications of the server environment 110. However, operations described as being performed by a particular application (e.g., server application 114) could be performed by one or more alternative applications, and/or operations described as being performed by multiple separate applications could in some instances be performed by a single application.

Client system 130 hosts a client application 132 which, when executed by the client system 130, configures the client system 132 to provide client-side functionality/interact with server environment 110 (or, more specifically, the server application 114 and/or other application provided by the server environment 110).

In the embodiments described herein client application 132 is a web browser application, which accesses the server application 114 via an appropriate uniform resource locator (URL) and communicates with the server application 114 via general world-wide-web protocols (e.g., http, https).

In the present disclosure, client application 132 receives data from the server application 114, which it uses to generate and display a timeline graphical user interface. This data may, for example, be webpage data that includes code (e.g., JavaScript code) that is stored in local memory of the client system 130 (e.g., memory 208 described below) and interpreted by the client application 132.

In certain embodiments, and as described in further detail below, the server data received by the client application 132 includes data in respect of (at least) two separate components or applications, which, when interpreted/executed, interact in order to provide the described functionality. For ease of reference, embodiments involving multiple components will be referred to as the multi-component embodiments.

In the multi-component embodiments described below, the client application 132 is a web browser application and the components are React components (supported by the JavaScript React library). The components may, however, be alternative software components (or applications) that interact with one another in order to provide the described functionality. In the multi-component examples described below, the components include a timeline component 134 and an iterations component 136. Interpretation or execution of the components by client application 132 causes creation of at least one state store for storing data relevant to the client application. In the examples described below, two state stores are created: a timeline component state store 138 (in which data relevant to that timeline component 134 is stored); and an iterations component state store 138 (in which data relevant to the iterations component 136 is stored). State stores 138 and 140 are created and maintained in local memory of client system 130 (e.g., volatile memory 208 described below). State stores 138 and 140 may be sweet-state stores supported by the 'react-sweet-state' library (though alternative stores may be used).

In addition, interpretation/execution of the components causes a shared context 142 to be created. The shared context 142 provides a mechanism for the timeline and iterations components 136 to share data. By way of example, the shared context 142 may include a context for sharing the drag state and/or interaction of task indicators in the timeline interface. As another example, the shared context 142 may include a context for sharing the mouse position state and/or interaction when mouse cursor is hovering over an empty task timeline. While a single shared context 142 is described and illustrated multiple shared contexts may be created.

In alternative embodiments, client application 132 may be a native application programmed to communicate with server application 114 using defined application programming interface (API) calls.

A given client system such as 130 may have more than one client application 132 installed and executing thereon. For example, a client system 130 may have a (or multiple) general web browser application(s) and a (or multiple) native client application(s).

While networked environment 100 depicts a single client system 130, server environment 110 will typically serve many client systems 130.

The techniques and operations described herein are performed by one or more computer processing systems.

By way of example, client system 130 may be any computer processing system which is configured (or configurable) by hardware and/or software to offer client-side functionality. A client system 130 may be a desktop computer, a laptop computer, tablet computing device, mobile/smart phone, or other appropriate computer processing system.

Similarly, the applications of server environment 110 are also executed by one or more computer processing systems. Server environment computer processing systems will typically be server systems, though again may be any appropriate computer processing systems.

Figure 2:
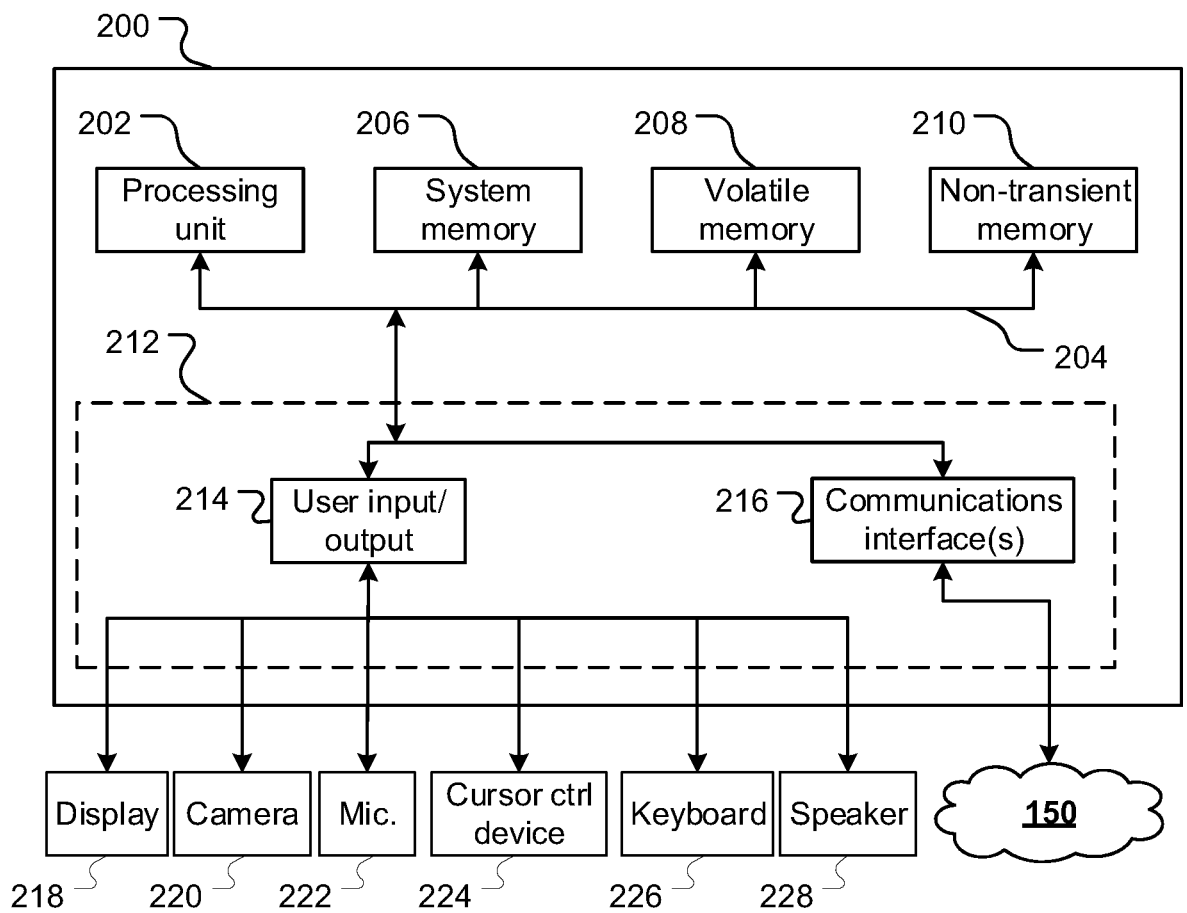
FIG. 2 is a block diagram of a computer processing system configurable to perform various features of the present disclosure.

FIG. 2 provides a block diagram of a computer processing system 200 configurable to implement embodiments and/or features described herein. System 200 is a general-purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g., a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store computer readable instructions and/or data which are executed by the processing unit 202 to control operation of the processing system 200. In this example system 200 includes a system memory 206 (e.g., a BIOS), volatile memory 208 (e.g., random access memory such as one or more DRAM modules), and non-transient memory 210 (e.g., one or more hard disk or solid-state drives).

System 200 also includes one or more interfaces, indicated generally by 212, via which system 200 interfaces with various devices and/or networks. Other devices may be integral with system 200 or may be separate. Where a device is separate from system 200, connection between the device and system 200 may be via wired or wireless hardware and communication protocols and may be a direct or an indirect (e.g., networked) connection.

Wired connection with other devices and/or networks may be by any appropriate standard or proprietary hardware and connectivity protocols. For example, system 200 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 200 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which system 200 connects— whether by wired or wireless means—include one or more input devices to allow data to be input into/received by system 200 and one or more output device to allow data to be output by system 200. Example devices are described below; however, it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboard, mouse, trackpad, microphone, accelerometer, proximity sensor, GPS, and/or other input devices. System 200 may also include or connect to one or more output devices controlled by system 200 to output information. Such output devices may include devices such as a display (e.g., a LCD, LED, touch screen, or other display device), speaker, vibration module, LEDs/other lights, and/or other output devices. System 200 may also include or connect to devices, which may act as both input and output devices, for example, memory devices (hard drives, solid state drives, disk drives, and/or other memory devices) which system 200 can read data from and/or write data to, and touch screen displays which can both display (output) data and receive touch signals (input).

By way of example, where system 200 is a client system such as 130 it may include a display 218 (for example, a touch screen display), a camera device 220, a microphone device 222 (which, for example, may be integrated with the camera device), a cursor control device 224 (e.g., a mouse, trackpad, or other cursor control device), a keyboard 226, and a speaker device 228.

System 200 also includes one or more communications interfaces 216 for communication with a network, such as network 150 of environment 100 (and/or a local network within the server environment 110). Via the communications interface(s) 216, system 200 can communicate data to and receive data from networked systems and/or devices.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—e.g., computer readable instructions and data, which, when executed by the processing unit 202, configure system 200 to receive, process, and output data. Instructions and data can be stored on non-transient machine-readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications, which, when executed by the processing unit 202, configure system 200 to perform various computer-implemented processing operations described herein. For example, and referring to the networked environment of FIG. 1 above, server environment 110 includes one or more systems that run a server application 114 and a data storage application 116. Similarly, client system 130 runs a client application 132.

In some cases, part or all of a given computer-implemented method will be performed by system 200 itself, while in other cases processing may be performed by other devices in data communication with system 200

Turning to FIG. 3, an example graphical user interface (GUI) 300 is depicted. GUI 300 is generated by client application 132 (in conjunction with an operating system of the client system 130) and displayed on a display 218 client system 130. GUI 300 is displayed in accordance with data received from the server application 114.

As noted above, the project management tool of the described embodiments is provided via a client-server architecture. Accordingly, data displayed in GUI 300 includes data communicated to the client application 132 by the server application 114.

GUI 300 is a timeline interface. GUI 300 will typically form part of (or be accessed via) a broader project management user interface which provides access to other functions provided by the project management tool (for example, creating, editing, saving, and/or deleting projects; creating, editing, saving, and/or deleting tasks; creating, editing, saving, and/or deleting teams; defining iterations, etc.).

In the present example, GUI 300 presents a timeline that runs from left (earlier times) to right (later times). The present disclosure is described with reference to such a timeline. It will be appreciated, however, that alternative timelines are possible—e.g., a timeline running from top-to-bottom (or vice versa), and that the described embodiments may be adapted to work with such alternatives.

GUI 300 generally includes a list region 310 and a timeline region 340.

The list region 310 provides a list of tasks (or, more specifically, task labels, each of which corresponds to a task defined in the project's task data). In the current left-to-right timeline example, the list of tasks is a vertical list. In the present example, the tasks include epics 312 and stories 314 (which may be referred to as sub-tasks). For each epic 312, an associated expand/collapse control 316 is displayed, operation of which toggles an epic 312 between an expanded state (in which the stories associated with the epic are displayed in the list region 310) and a collapsed state (in which the stories associated with epic are not displayed).

In particular, GUI 300 displays: a first epic 312A (labelled "Epic 1") which is expanded to display its two stories (sub-tasks) 314A (labelled "Story 1.1") and 314B (labelled "Story 1.2"); a second epic 312B (labelled "Epic 2") which is collapsed (and therefore does not show any stories); and a third epic 312C (labelled "Epic 3") which is expanded to display seven stories (sub-tasks) 314C-314I (labelled "Story 3.1" to "Story 3.7" respectively).

Timeline region 340 of GUI 300 is used to display task timelines.

Timeline region 340 includes a header region 342. Header region 342 displays time interval labels 344 which indicate both the overall time period currently displayed in the timeline region 340 as well as intervals within that period. In example GUI 300, the time intervals displayed in timeline region 340 are months as indicated by the time interval labels 344A ("JUL"), 344B ("AUG"), and 344C ("SEP"). In the present example, time intervals are visually indicated in the main area of the timeline region 340 by vertical lines 346. Time intervals may be visually indicated in alternative ways (e.g., by alternate shading of adjacent intervals or the like).

Header region 342 also displays iteration markers 348, which indicate iterations (e.g., sprints) relevant to the project being displayed. In this example, seven iteration markers 348A-348G are displayed/partially displayed (with labels "Sprint E" through to "Sprint K, L").

In the present horizontal timeline example, each iteration marker 348 is a horizontally oriented bar that is vertically aligned with the time interval labels 344 to indicate the timing of the iteration represented by the marker 348. To this end, each iteration marker 348 may include an iteration start indicator 350 (in this case the left edge of the iteration marker 348), which is aligned with the start time/date of the iteration it represents, and an iteration end indicator 352 (in this case the right edge of the iteration marker 348), which is aligned with the end time/date of the iteration it represents.

If an iteration's start and end both fall within the time period displayed in the timeline region 340, its start and end indicators 350 and 352 are both displayed. Iteration markers 348B-348F provide examples of this.

Conversely, if the start and/or end of an iteration fall outside the time period displayed in the timeline region 340, the start and/or end indicators 350/352 are not displayed (the iteration marker 348 then appearing to extend beyond the timeline region 340 to the left and/or right). Iteration marker 348A provides an example where the start indicator 350 is not displayed (indicating the start of "Sprint E" is earlier than the time period currently displayed). Iteration marker 348G provides an example where the end indicator 352 is not displayed (indicating the ends of "Sprint K" and "Sprint L" are later than the time period currently displayed).

In the present example, iterations may overlap one another. For example, iteration marker 348G has a label "Sprint K, L." This indicates that there are two concurrent iterations (Sprint K and Sprint L) at the time indicated by that iteration marker. As a second example, the end indicator of iteration marker 348F (labelled "Sprint I") has a different visual appearance to the other iteration end markers (in this case an arrow appearance). This indicates that the iteration indicated by marker 348B extends beyond the end of the displayed marker (and, in this case, the end of "Sprint I" overlaps at least the start of "Sprint K" and "Sprint L").

Timeline region 340 of the present example also includes a time interval selector 354, which can be used to cause the timeline region to display different time intervals—in this example either weeks, months, or quarters. Alternative time intervals are possible, and in (though alternatives are possible) Timeline region 340 also includes a current date indicator 356, in this case a vertical line which is horizontally positioned to indicate the current date. In this particular example, the current date indicator 356 is visually distinguished over vertical lines 346 (which indicate time intervals) by being a heavier weight line. Alternatively, the current date indicator 356 may, for example, be displayed in a different colour and/or different line style.

The main area of the timeline region 340 defines a task timeline (see example area 358) for each task displayed in the list region 310. In the present disclosure, the task timeline for a given task is the area of the timeline region 340 that corresponds to the task's label or indicator (in the list region 310). As the present example is a left-to-right timeline, the task timeline for a given task is a rectangle that extends horizontally across the timeline region 340 and has a height (and vertical position) matching the task's label. For example, task timeline 358 corresponds to the task labelled "Story 3.5."

In the present example, task timelines for sub-tasks are not indicated by explicit visual cues within the timeline region 340. Rather, they are perceived based on the vertical positioning of the sub-task labels 314. In alternative embodiments, task timelines may be indicated by explicit visual cues, for example alternate appearances (e.g., shading) for adjacent task timelines, horizontal lines (or other visual cues) separating adjacent task timelines, or any other appropriate means.

Within the timeline region 340, client application 132 displays scheduling indicators 360, which indicate when the task is scheduled.

In the present horizontally oriented timeline example, each scheduling indicator 360 is a horizontally oriented bar that is vertically aligned with the time interval labels 344 to indicate the scheduled timing of the indicated task. Each scheduling indicator 360 is displayed in the task timeline 358 of the task the scheduling indicator 360 represents. In other words, each scheduling indicator 360 is aligned (horizontally in the present example) with the label of the task represented by the indicator 360 in the list region 310.

A scheduling indicator 360 may include a task start indicator 362 (in this case the left edge of the scheduling indicator 360), which is aligned with the start time/date of the task it represents and a task end indicator 364 (in this case the right edge of the scheduling indicator 360), which is aligned with the end time/date of the task it represents.

If a task's start and end time/dates both fall within the time period displayed in the timeline region, its start and end indicators 362 and 364 are both displayed. Scheduling indicator 360A provides an example of this.

Conversely, if the start and/or end date of a task fall outside the time period displayed in the timeline region 340 the start and/or end indicates 362/364 are not displayed (the scheduling indicator 360 then appearing to extend beyond the timeline region 340 to the left and/or right). Scheduling indicator 360B (corresponding to "Epic 3") provides an example of this, with the task start indicator 356 not displayed (indicating the start date of "Epic 3" is earlier than the time period currently displayed).

If a given task has not yet been scheduled, or it has been scheduled but for a time period that does not overlap the time period currently displayed in the timeline region 340, no scheduling indicator 360 is displayed for that task.

In the present example, the scheduling indicator 360 of an epic indicates the scheduling of the epic's stories (subtasks). For example, scheduling indicator 360A represents task 312A ("Epic 1"). Task 312A includes two sub-tasks 314A ("Story 1.1" indicated by scheduling indicator 360C and "Story 1.2" indicate by scheduling indicator 360D). Accordingly, the start indicator 362 of scheduling indicator 360A aligns with the start indicator of scheduling indicator 360C (the earliest start of Epic 1's subtasks) and the end indicator 364 of scheduling indicator 360A aligns with the end indicator of scheduling indicator 360D (the latest finish of Epic 1's subtasks).

In some instances, GUI 300 is configured to allow cursor-driven input—e.g., input via a cursor control device 224 such as a mouse, trackpad, or other cursor control device. In this case, application 132 displays a cursor 366 at a position in GUI which corresponds to user interactions with the cursor control device 224.

Client application 132 may be configured to display scheduling indicators 360 with different visual appearances to indicate, for example: a completion state of a task represented by a given scheduling indicator 360 (e.g., not started, in progress, completed); a particular team the task represented by a given scheduling indicator 360 has been assigned to; the task family of the task represented by a given scheduling indicator (e.g., by displaying a particular epic and its stories with one appearance which is visually distinguished over the appearance of a different epic and its stories); and/or alternative aspects of the task. Providing scheduling indicators 360 with different appearances can be achieved in various ways—e.g., by use of different fill colours, different fill patterns, different line colours, different line styles, different icons, and/or a combination of these or any other visually distinguishing attributes.

In certain embodiments, client application 132 may include one or more underlying processes which process certain user inputs detected in the timeline region 340 to associate those inputs with specific tasks and specific times. For example, application 132 may track user input that adjusts a cursor position and/or or touch input, and associate the coordinates of those inputs (e.g., x, y coordinates) to a particular task and particular time. In the present horizontal timeline example, client application 132 determines the particular task based on the vertical (e.g.) coordinate of the input (the particular task being the task currently displayed in the task region 310 at that y coordinate) and the particular time based on the horizontal (e.g.) coordinate of the input (the particular time being the time within the currently displayed time period that corresponds to that x coordinate). For example, in GUI 300 of FIG. 3, client application would determine that the user input that has positioned cursor 366 at the depicted location is associated with the "Story 3.5" task and the time of (approximately) 15 July.

In the multi-component embodiments, association of the user input position with a particular task and a particular time may be performed by the timeline component 134 and this data passed or made available to other components (e.g., iterations component 136). This allows the iterations component 136 to perform processing based on tasks and times rather than itself having to convert input coordinates to tasks and times. It also allows the iterations component 136 to cause the timeline component 134 to display UI elements (such as the iteration markers 348) using time as the coordinate system rather than screen (e.g.) coordinates. Iterations component 136 may cause the timeline component 134 to display iteration marker 348C by using a time range (e.g., 13-17 Aug. 2021) rather than by using screen coordinates.

As described in detail below, client application 132 is configured to permit user interaction with scheduling indicators 360—in particular the scheduling indicators 360 of subtasks (stories) to assign the tasks represented by those scheduling indicators 360 to particular iterations (sprints).

While not shown in FIG. 3, timeline interface 300 permits scrolling interactions to display alternative tasks and/or alternative time periods. For example, client application 132 is configured so that a vertical scrolling interaction causes scrolling through available tasks and a horizontal scrolling interaction causes scrolling to later/earlier time periods. Client application 132 may facilitate scrolling interaction by providing scroll controls (e.g., horizontal and/or vertical scroll bars or other scroll controls). Alternatively, or additionally, client application 132 may facilitate scrolling interaction by detecting particular gestures (where display 218 is a touch screen display) or other interactions (e.g., defined cursor control device interactions, keyboard shortcuts, and/or other interactions).

Figure 4:
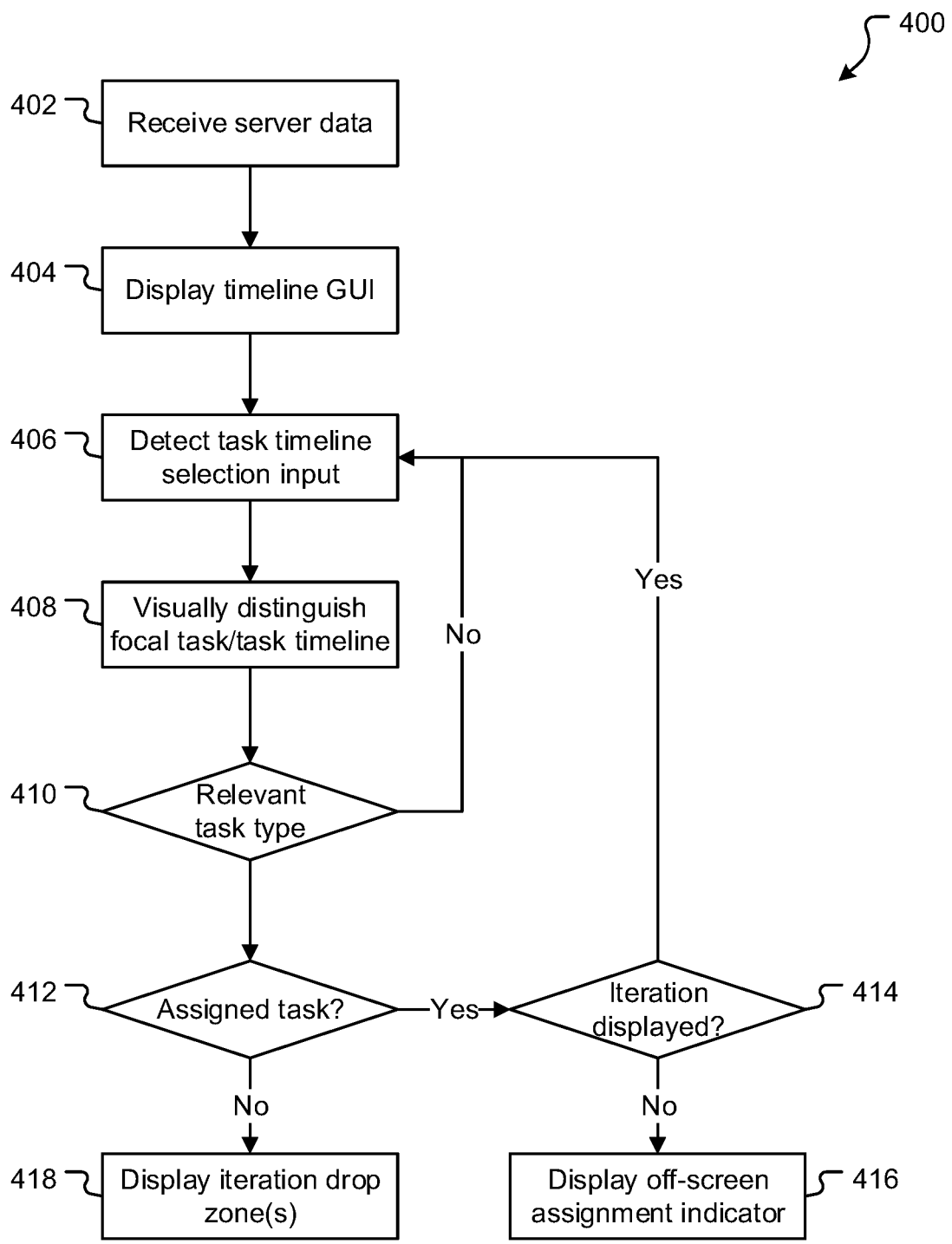
FIG. 4 depicts operations involved in an iteration visualisation process.

Turning to FIG. 4, an iteration visualisation process 400 will be described. The operations of visualisation process 400 are performed by client application 132 (shortened to application 132 in this section for convenience).

At 402, application 132 receives server data from the server application 114. In the present examples, the server data includes project data that, in turn, includes task data in respect of one or more tasks that are displayed in the first GUI state, iteration data defining iterations to which the tasks have been or could be assigned to, and task assignment data indicating (for any tasks that have been assigned to an iteration), which iteration a given task has been assigned to. The server data may be received in response to a request generated by application 132—for example, a request initiated by application 132 on launching a timeline application. Alternatively, the server data may be received in response to a user changing relevant parameters—e.g., changing timeline parameters (e.g., parameters that impact that dates displayed by the timeline) and/or task filters, which impact which tasks are retrieved and displayed.

At 404, application 132 uses the project data to display a timeline GUI (such as GUI 300) on a display 218 of client system 130.

Application 132 displays the timeline GUI in a first state. The first GUI state includes a first displayed time period— e.g., the period of time that timeline region 340 represents (which in FIG. 3 is from mid-June to mid-September of a particular year). The first GUI state also includes a first set of displayed tasks (which, in FIG. 3, are listed in the list region 310). In example GUI 300, the first set of displayed tasks includes three epics 312, one of which (312B) is collapsed and two of which (312A and 312C) are expanded to show their sub-tasks/stories (314A-B and 314C-I respectively).

In this particular implementation, iterations are only relevant to story-type tasks: e.g., while a story-type task 314 can be assigned to an iteration an epic type task 312 cannot. In other implementations, however, application 132 may only display tasks of a single type (that type of task being capable of being assigned to an iteration) and/or application 132 may be configured to enable assignment of additional and/or alternative task-types to iterations.

Relevantly, the first state of the timeline GUI displayed at 404 includes at least one task which can be assigned to an iteration.

Application 132 displays the timeline GUI based on project data received from the server application 114.

In the present example, the first state of the timeline GUI 300 includes iteration markers 348, which, as described above, indicate iterations (e.g., sprints) that are relevant to the tasks displayed in the list region 310.

The first state of the timeline GUI displayed at 404 may be an initially displayed state. Alternatively, the first state of the timeline GUI 404 may be the result of user interaction with an initially displayed timeline GUI. Such user interaction may include, for example, user input: selecting a particular time period (e.g., by manually entering a start and/or end date, scrolling or otherwise navigating to earlier and/or later start/end dates, alternatively selecting a particular time period); selecting particular tasks to be displayed (which may, for example, be user input selecting a project which results in that project's tasks being displayed);

expanding and/or collapsing tasks (e.g., via controls such as 316); and/or other user input.

At 406, application 132 detects a user input selecting a task timeline 358 that is displayed in the timeline GUI 300. This will be referred to as a task timeline selection input (or first user interaction), and the task of the selected timeline will be referred to as the focal task.

In the present embodiment, the task timeline selection input is a cursor-over user input in a task's timeline 358 (e.g., the GUI area that is in the timeline region 340 and aligned—vertically in the present example—with a task that is displayed in the task list area 310). A cursor-over interaction occurs when a user interacts with a user input device (e.g., a cursor control device 224) to cause an on-screen cursor 366 to hover within the area of a particular task timeline 358 for at least a predetermined hover time (e.g., 0.2 seconds or an alternative hover time).

The task timeline selection input may be an alternative user input. As one example, where display 218 is a touch screen display, the first type of user input may be a tap input in the area defined by a particular task timeline.

Figure 5:
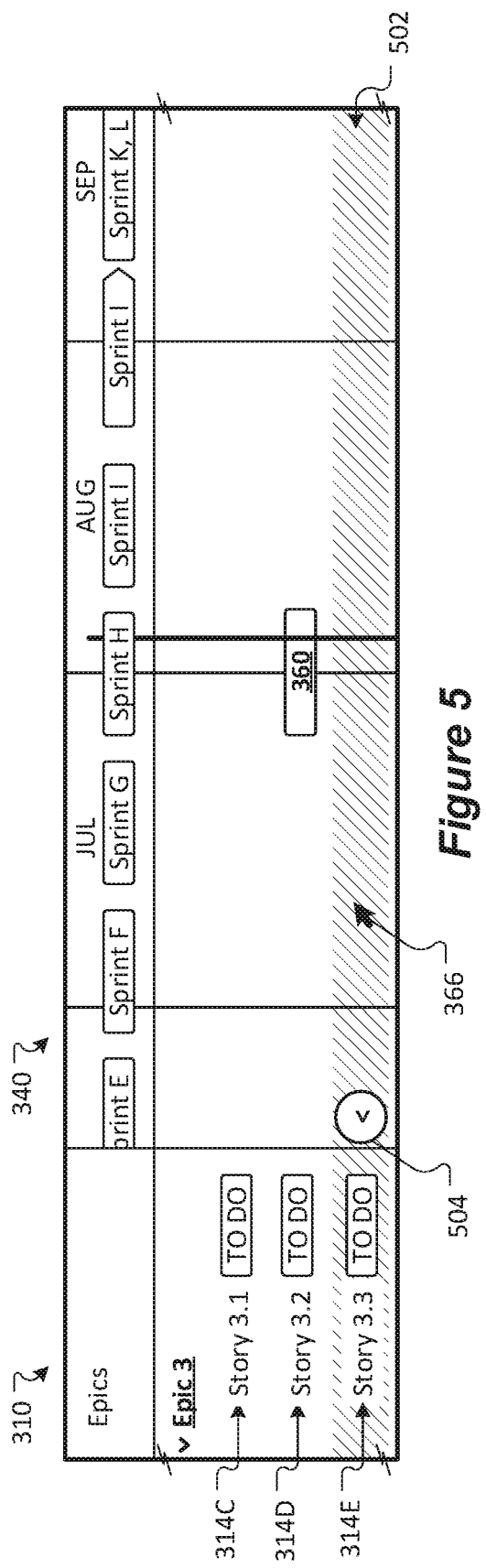
FIGS. 5 and 6 depict example graphical user interfaces.

At 408, and in the present embodiment, application 132 visually distinguishes the focal task and its task timeline. FIG. 5 depicts a partial version of GUI 300 which provides one example of this. In FIG. 5, application 132 detects a cursor-over interaction is detected in task timeline 502 (corresponding to task 314E) and has visually distinguished the task 314E (in the list region 310) and the task's timeline 502 (in the timeline region 340) compared to the other tasks/task timelines displayed in the timeline interface 300. In the example GUIs, this visual distinction is indicated by oblique shade lines for the selected task/task's timeline and no shading for other tasks/task timelines. Alternative techniques for visually distinguishing the task's timeline 502 and/or label 314E are possible.

While visually distinguishing the focal task and/or its timeline provides useful visual feedback to a user, operation 408 need not be performed in all embodiments.

At 410, application 132 determines if the focal task is a relevant task. In the present embodiments, a relevant task is one that is capable of being assigned to an iteration. Application 132 may be configured to determine this based on task type. For example, in the present examples an epic-type task cannot be assigned to an iteration and as such is not a relevant task. A story-type task is, however, a relevant task.

If the selected focal task is a relevant task processing proceeds to 412. Otherwise processing returns (in this example) to 406 to determine if a new focal task has been selected.

At 412, application 132 determines if the focal task is assigned to an iteration. In the present example, this determination is made with reference to the task-iteration data.

If the focal task is assigned to an iteration, processing proceeds to 414. Otherwise, processing proceeds to 418.

At 414, application 132 determines if the iteration that the focal task is assigned to is displayed (or partially displayed) on-screen. This will be the case if the start and/or end date of the particular iteration that the focal task is assigned to fall within the time period currently displayed by the timeline GUI.

If the iteration that the focal task is assigned to is not displayed on-screen, processing proceeds to 416. Otherwise, processing returns (in this example) to 406 to determine if a new focal task has been selected.

At 416, the focal task is assigned to an iteration, but that iteration is not displayed. In this case, application 132 causes and off-screen assignment indicator to be displayed. The off-screen assignment indicator indicates to a user that the focal task has been assigned to an iteration, even though that iteration does not fall within the time period currently displayed by the timeline GUI 300. In the present embodiments, application 132 displays an off-screen assignment indicator in the focal task's timeline. If the iteration the focal task is assigned to has an end date that is before the earliest time currently displayed, application 132 displays an earlier off-screen assignment indicator at a first position (in this case a left region of the task's timeline). If the iteration the focal task is assigned to has a start date that is after the latest time currently displayed, application 132 displays a later off-screen assignment indicator at a second position (in this case a right region of the task's timeline).

FIG. 5 provides one example of an off-screen assignment indicator 504. In FIG. 5, the first type of user interaction is user interaction that has caused cursor 366 to hover in the task timeline 502 of task 314E. Focal task 314E is determined to be assigned to an iteration, but the end of that iteration is before the earliest date currently displayed in the timeline region 340. Accordingly, an earlier off-screen assignment indicator 504 is displayed.

At 418, application 132 determines that the focal task has not been assigned to an iteration. In this case, application 132 causes one or more iteration drop zones to be displayed.

Figure 6:
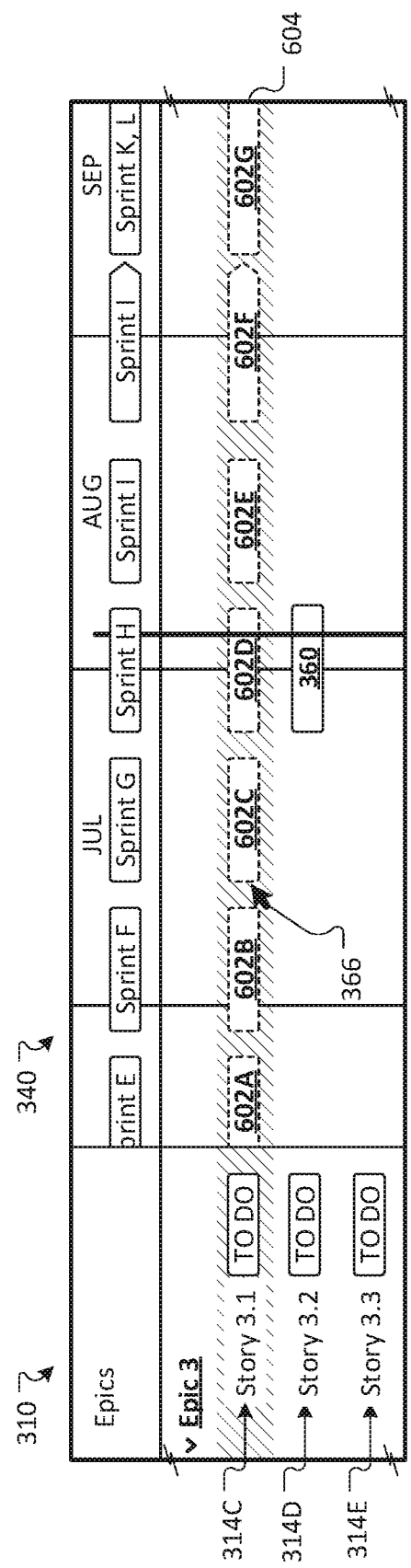

FIG. 6 depicts a partial version of GUI 300 in which drop zones 602 are displayed. In FIG. 6, a user has caused cursor 366 to hover in task timeline 604 of task 314C. Task 314C is not assigned to an iteration and, accordingly, application 132 displays iteration drop zones 602. In particular, an iteration drop zone 602 is displayed for each iteration that falls within (or partially within) the period of time currently depicted in the timeline region 340 of GUI 300.

In the present horizontal timeline example, each drop zone 602 is a horizontally oriented bar that is vertically aligned with its corresponding iteration marker 348. Each drop zone 602 is displayed in the focal task's timeline—timeline 604 in this example. As such, the drop zones 602 are aligned (horizontally in the present example) with the label of the focal task (314C in this example). As with the iteration markers 348, a given drop zone 602 may extend off-screen to indicate it starts earlier than the currently displayed time period (e.g., drop zone 602A) and/or ends later that the currently displayed time period (e.g., drop zone 602G).

In certain embodiments, application 132 is configured to visually distinguish drop zones 602 that correspond to available iterations (referred to as available drop zones) from drop zones that correspond to unavailable/closed iterations (referred to as unavailable drop zones).

Application 132 displays drop zones and determines iteration availability in accordance with the iteration data (which defines the start and end times of iterations that fall within the currently displayed time period) and the task-iteration data (which defines whether a given iteration already has a task assigned to it).

To illustrate, in FIG. 6, all drop zones are available except the drop zone corresponding to the "Sprint I" iteration. Accordingly, drop zones 602A, 602B, 602C, 602D, 602F, and 602G are displayed in an available drop zone appearance and drop zone 602E (which corresponds to "Sprint I") is displayed in an unavailable drop zone appearance. In the example GUIs, the available drop zone appearance is indicated by a white fill and the unavailable drop zone appearance is indicated by a pattern fill. Alternative techniques for visually distinguishing available/unavailable drop zones are possible.

In alternative embodiments, application 132 may only display drop zones that correspond to available iterations (and not display a drop zone if it corresponds to an unavailable iteration).

Application 132 is also configured to visually distinguish drop zones 602 from scheduling indicators 360. In the example of FIG. 6, drop zones 602 are depicted with a dashed outline and scheduling indicators 360 depicted with a solid outline. Once again, alternative techniques for visually distinguishing UI elements are possible.

Iteration visualisation process 400 is performed while the task timeline selection input is detected. At any point a user may select a new focal task (e.g., by moving the cursor to a new task timeline) at which point processing returns to 406. Where a new focal task is selected application 132 causes relevant GUI elements in respect of the previous focal task to be removed from the display—e.g., the previous focal task's timeline is returned to its 'normal' (undistinguished) appearance, if an off-screen assignment indicator is displayed for the previous focal task this is removed, or if drop zones are displayed for the previous focal task these are removed.

As discussed below with reference to FIG. 7, a user may further interact with the focal task's timeline in order to assign the focal task to an iteration.

Figure 7:
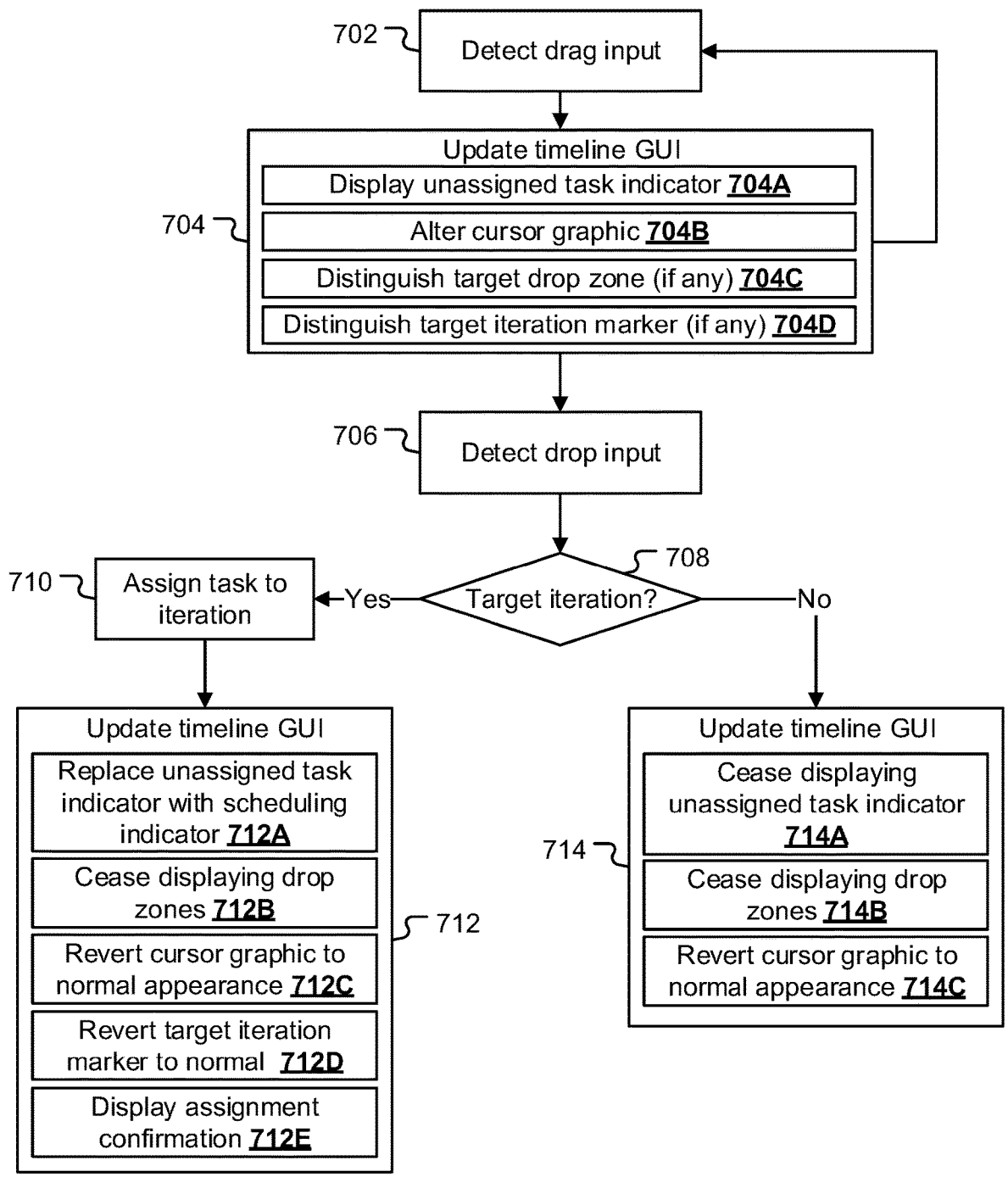
FIG. 7 depicts operations involved in an unassigned task assignment process.

Turning to FIG. 7, an assign unassigned task process 700 will be described. The operations of process 700 are performed by client application 132 (shortened to application 132 in this section for convenience).

In the present example, process 700 follows on from operation 418 of process 400 described above: e.g., client application 132 has determined a focal task that has not been assigned to an iteration and is displaying drop zones 602 that visually indicate iterations that the focal task could be assigned to.

At 702, client application detects a drag input within (or in proximity to) the focal task's timeline. The drag input may be initiated, for example, by activation of a cursor control device 224 input (e.g., clicking and holding a left (or other) button thereof); a dwell/drag gesture within (or in proximity to) the focal task's timeline on a touch screen display, or an alternative input.

At 704, in response to detecting the drag input, application 132 updates the timeline GUI. In the present examples this involves application 132 causing several GUI updates.

Figure 8:
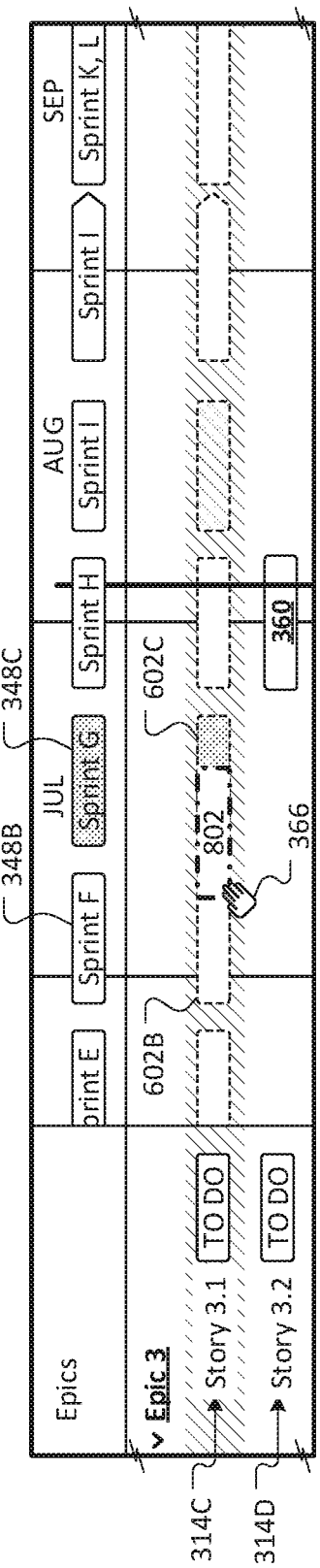
FIGS. 8 to 12 depict example graphical user interfaces.

At 704A, application 132 causes an unassigned task indicator to be displayed. The unassigned task indicator 802 is displayed at a position based on the cursor or input position. For example, a left edge of the unassigned task indicator 802 is aligned with the x-coordinate of the cursor position. FIG. 8 depicts an unassigned task indicator 802. In this example, the unassigned task indicator 802 is visually distinguished from drop zones 602 and from the scheduling indicators 360 of any assigned tasks. In this example: the scheduling indicator 360 of an assigned task has a solid outline; drop zones 602 have a dashed outline; and the unassigned task indicator 802 has a dot-dash outline. Alternative mechanisms for visually distinguishing UI elements are possible.

At 704B, application 132 causes the cursor graphic to be altered. In the present example, application 132 has caused the cursor graphic to change from an arrow (see FIG. 6) to a hand (see FIG. 8). This indicates to the user they are interacting with/holding the unassigned task indicator 802 and can move/drag that indicator within the focal task's timeline.

At 704, application 132 also attempts to identify a target iteration. The target iteration is the iteration that the focal task (e.g., the task represented by unassigned task indicator 802) would be assigned to if an assign task input was detected with at the current input position (e.g., if the user 'dropped' the unassigned task indicator 802 in its current position).

In the present example, with a horizontal timeline, application 132 determines whether there is a target iteration (and, if so, which particular iteration that is) based on the current drag position (e.g., the horizontal (in this case) position of the drag input) and whether the current drag position is within a defined distance of an available drop zone 602 (or, alternatively, iteration marker 348—noting that these are vertically aligned). The defined distance may be calculated based on the width of the unassigned task indicator 802 and the width of the available drop zones 602. If most of the unassigned task indicator 802 horizontally overlies a particular drop zone 602, the current drag position will be within the defined distance of that drop zone 602. If the unassigned task indicator 802 does not overlie any available drop zone 602 (or does not overlie any available drop zone 602 by at least a threshold amount), the current drag position will not be within the defined distance of any drop zone 602 and application 132 may determine that there is no target iteration. Alternatively, in this case application 132 may determine the target iteration to be the iteration associated with the drop zone 602 that is horizontally closest to the current drag position.

If a target iteration is identified, application 132 visually distinguishes: the drop zone 602 corresponding to the target iteration (referred to as the target drop zone) at 704C; and the iteration marker 348 corresponding to the target iteration (referred to as the target iteration marker) at 704D. FIG. 8 provides examples of each of these GUI updates.

In the example of FIG. 8, application 132 has identified the iteration corresponding to iteration marker 348C as the target iteration. Accordingly, client application 132 causes the target drop zone 602C to be visually distinguished over other displayed drop zones. In the example of FIG. 8, a target drop zone has a target drop zone appearance (in this example a solid grey shading, e.g., 602C). The target drop zone appearance is different to the available drop zone appearance and to the unavailable drop zone appearance. Once again, alternative means for visually distinguishing the drop zones are possible.

FIG. 8 also depicts an iteration marker 348C that is visually distinguished over other iteration markers (e.g., 348A). Client application 132 causes the target iteration marker (in this case 348C) to be visually distinguished to provide additional feedback to the user as to the current target iteration. In this example, non-target iteration markers 348 have a non-target iteration marker appearance (in this example no/white shading, e.g., 348B) and the target iteration marker has a target iteration marker appearance (in this case grey shading, e.g., 348C). Once again alternatives for visually distinguishing iteration markers are possible.

As the drag input is received application 132 continues to process the input to determine whether there is a change to the target drop zone (in this case based on the horizontal position of the cursor). If there is a change to the target drop zone application 132 updates the timeline GUI accordingly—e.g., by distinguishing the new target drop zone/iteration marker (at 704C/704D) and reverting a previous target drop zone/iteration marker to their 'normal' appearance (or, in the event input result in no target drop zone being identified, reverting a previous target drop zone/ iteration marker to their 'normal' appearance without distinguishing a new target drop zone/iteration marker).

Figure 9:
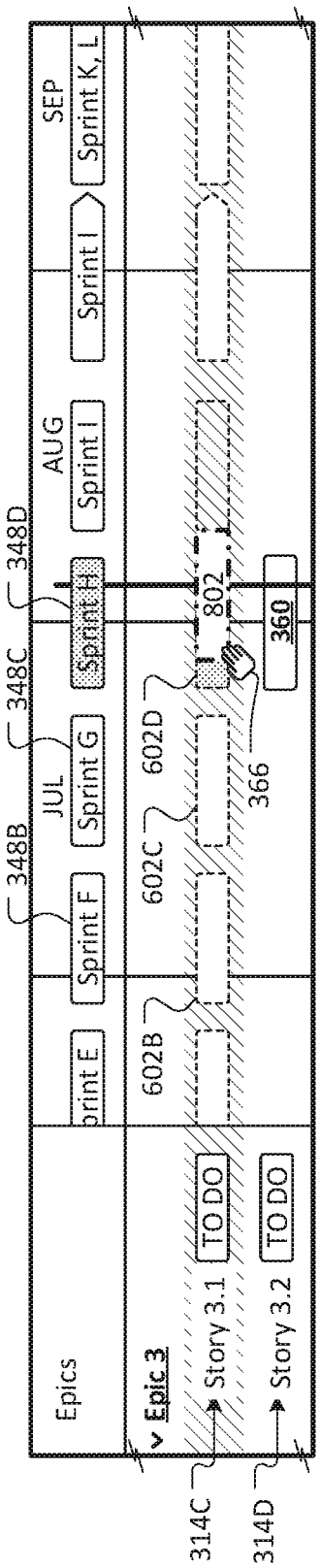

For example, FIG. 9 shows GUI 300 after user input dragging the unassigned task indicator 802 from its position in FIG. 8 to a new position. Movement to the new position has resulted in application 132 identifying a new target iteration—that corresponding to iteration marker 348 and drop zone 602D. Accordingly, application has caused: drop zone 602C (no longer the target drop zone) to revert to the available drop zone appearance; drop zone 602D (now the target drop zone) to be distinguished (e.g., displayed with the target drop zone appearance); iteration marker 348C (no longer the target iteration marker) to revert to the non-target iteration marker appearance; iteration marker 348D (now the target iteration marker) to be distinguished (e.g., displayed with the target iteration marker appearance).

Figure 10:
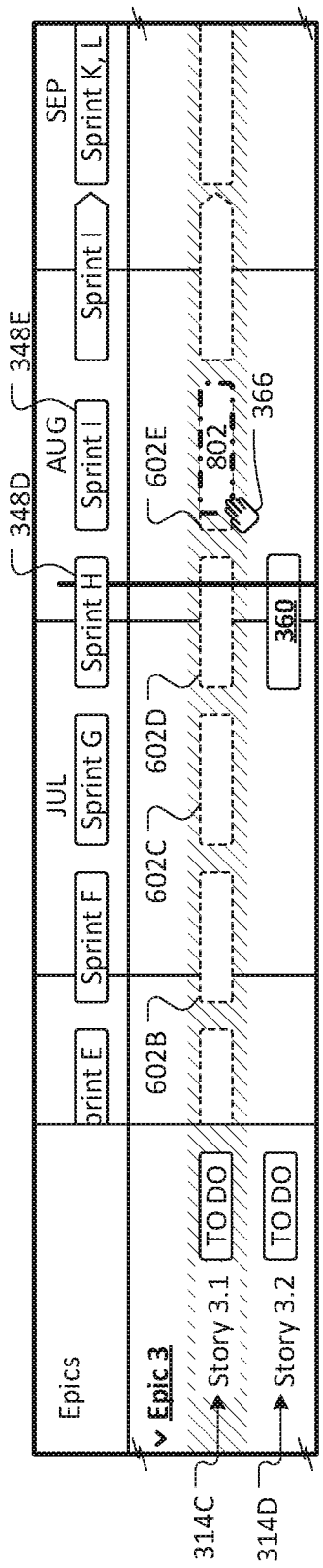

As a further example, FIG. 10 shows GUI 300 after user input dragging the unassigned task indicator 802 from its position in FIG. 9 to a new position. In FIG. 10, the new position largely overlies drop zone 602E, which corresponds to the iteration "Sprint I" (with iteration marker 348E). As this is an unavailable iteration, application 132 does not (in the present example) identify any target iteration or, therefore, visually distinguish any drop zone 602 or any iteration marker 348. This indicates to the user that if the unassigned task indicator 802 was dropped in its current position it would not be assigned to any iteration.

If application 132 determines that user input has moved the cursor out of (or beyond a threshold distance of) the focal task's timeline (in this example, by being moved too far up or down), application 132 ceases displaying the unassigned task indicator 802 without assigning the task to any iteration. In addition, and in the present example, application 132: ceases displaying drop zones 602; reverts any visually distinguished iteration marker 348 to the assigned or unassigned appearance as appropriate; and ceases visually distinguishing the focal task and focal task timeline (noting that the user input may result in a new focal task being identified).

At 706, application 132 detects a drop input—e.g., a user releasing the held button of a cursor control device or breaking contact with a touch screen display. The drop input is associated with a drop position, e.g., the cursor position at the time the drop input occurs.

At 708, application 132 determines if the drop position is associated with a target iteration. This may be performed as described above with reference to 704C (excepting the determination is made with respect to the drop position rather than the current drag position). If the selection input is associated with a target iteration, processing proceeds to 710. Otherwise, processing proceeds to 714.

At 710, application 132 assigns the focal task to the target iteration. By way of example, if the task input was received while the cursor 366/unassigned task indicator 802 were in the position shown in FIG. 8, application 132 would assign the focal task ("Story 3.1") to the "Sprint G" iteration. Conversely, if the task input was received while the cursor 366/unassigned task indicator 802 were in the position shown in FIG. 9, application 132 would assign the focal task ("Story 3.1") to the "Sprint H" iteration.

In order to assign the focal task to an iteration, application 132 generates a task assignment request and communicates this to the server application 114. The task assignment request includes at least an identifier of the focal task and information identifying the iteration in question (e.g., an iteration ID and/or other identifying information such as the iteration start date). On receiving the task assignment request the sever application 114 updates (in this example) the task-iteration data in data storage 118 (in this example, via data storage application 116) to record that the task has been assigned to that iteration.

If the target iteration is multiple concurrent iterations (e.g., per iteration "Sprint K" and "Sprint L" corresponding to iteration marker 348G), application 132 may be configured to automatically assign the focal work item to one of these iterations (e.g., the first iteration indicated in the label of the iteration marker 348). Alternatively, application 132 may display an iteration selection interface, which lists the concurrent iterations and allows a user to manually select a particular iteration.

Figure 11:
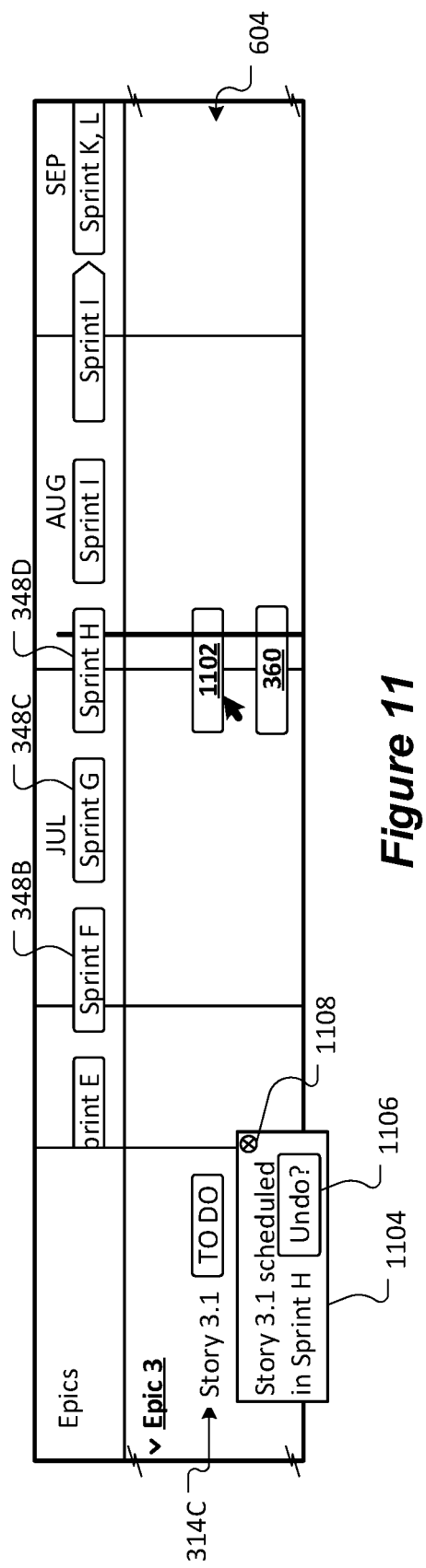

At 712, application 132 updates the timeline GUI 300 to indicate that the task has been assigned to the iteration. An example of this is depicted in FIG. 11, which depicts the task assignment that would occur if the drop input was received in GUI 300 of FIG. 9 (e.g., with "Sprint H" being the target iteration).

In the present example, updating the timeline GUI 300 at 712 involves application 132: replacing display of the unassigned task indicator 802 with a scheduling indicator 1102 indicating that the task has been assigned to an iteration and is now scheduled (which may involve displaying an animation that snaps the task or scheduling indicator to the target drop zone 602) (712A); ceasing display of the drop zones 602 (712B); reverting the cursor graphic to its 'normal' appearance (an arrow in this example) (712C); and ceasing to visually distinguish the target iteration marker (712D). In this example, application 132 has also ceased visually distinguishing the focal task's timeline (in this example task timeline 604).

In certain embodiments, application 132 also displays an assignment confirmation 1104, which provides further visual feedback that the task has been assigned (712E). Application 132 may display the confirmation 1104 on receiving confirmation from the server application 114 that the assignment has been recorded. In this example, an 'undo' control 1106 is also provided. If a user activates the undo control the task assignment is undone. This involves generating an undo assignment message (which includes at least a task identifier) and communicating this to the server (which, in response, reverts the task to its previously assigned iteration (if any) or unscheduling the task (where there is no previously assigned iteration)). If the undo control is activated application 132 also ceases to display the scheduling indicator for the task in question. Application 132 may automatically hide the assignment confirmation 1104 after a predetermined time period, and/or may provide a dismiss control such as 1108.

Figure 12:
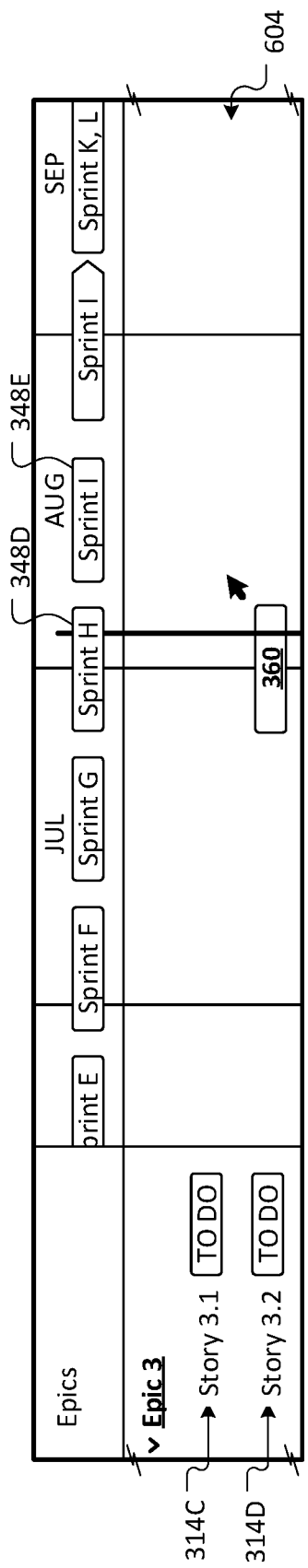

At 714, the drop input is not associated with a target iteration. In this case, application 132 does not assign the focal task to an iteration. At 714, application 132 updates the timeline GUI 300. An example of this is depicted in FIG. 12, which depicts what would occur if the drop input was received in the timeline GUI 300 depicted in FIG. 10 (e.g., with no target iteration identified).

In the present example, updating the timeline GUI 300, at 714, involves application 132: ceasing display of the unassigned task indicator 802 (714A); ceasing to display the drop zones 602 (714B); and reverting the cursor graphic to its 'normal' appearance (an arrow in this example) (714C). In this example, application 132 has also ceased visually distinguishing the focal task's timeline (in this example task timeline 604).

In certain implementations, application 132 may be configured to permit direct assignment of an unassigned task to an iteration. For example, in response to detecting selection of an available drop zone (e.g., by a cursor control device input click or double click, or a tap gesture) application 132 may assign the task to the iteration corresponding to the selected drop zone (per operation 710).

Figure 13:
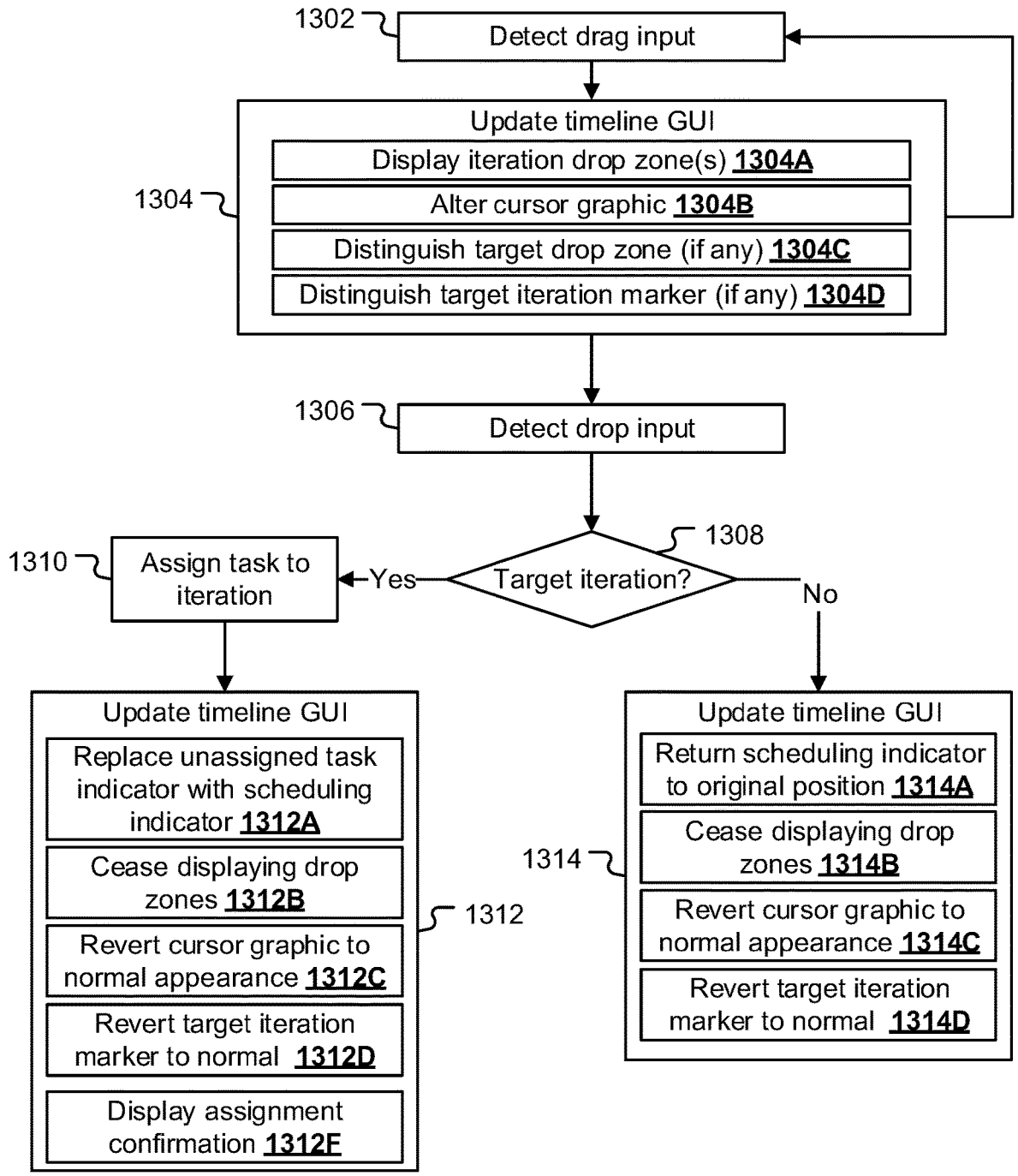
FIG. 13 depicts operations involved in a task reassignment process.

Turning to FIG. 13, a reassign task process 1300 will be described. The operations of process 1300 are performed by client application 132 (shortened to application 132 in this section for convenience).

Certain operations performed in process 1300 are similar to operations of the iteration visualisation process 400 and operations of the assign unassigned task process 700. Such operations will not be described again in detail.

In the present example, process 1300 follows on from operation application 132 determining (at 414 of iteration visualisation process 400) that the current focal task has been assigned to an iteration and that iteration is currently displayed in the timeline GUI 300. Consequently, a scheduling indicator 360 will be displayed in the focal task's timeline At 1302, client application detects a drag input within (or in proximity to) the focal task's scheduling indicator. The drag input may be initiated, for example, by activation of a cursor control device 224 input (e.g., clicking and holding a left (or other) button thereof); a dwell/drag gesture within (or in proximity to) the focal task's timeline on a touch screen display; or an alternative input.

At 1304, in response to detecting the drag input, application 132 updates the timeline GUI. In the present examples several updates to the timeline GUI are performed.

Figure 14:
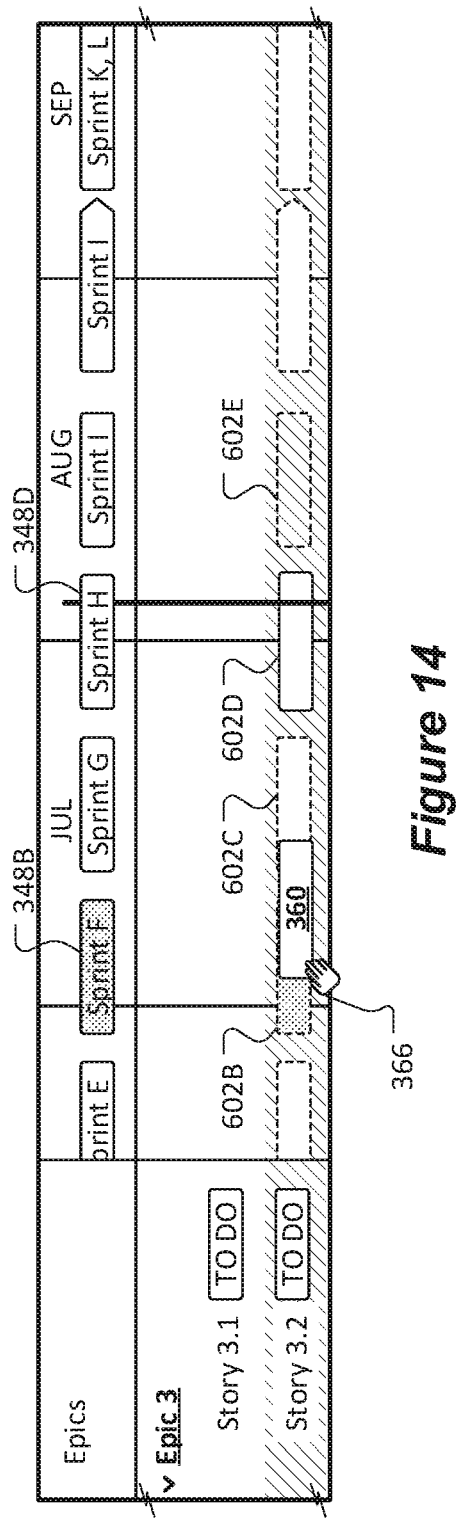
FIGS. 14 to 16 depict example graphical user interfaces.

At 1304A, application 132 causes iteration drop zones 602 to be displayed. This is similar to operation 418 described above. An exception, however, is that at 1304 the drop zone corresponding to the iteration that the focal task is currently assigned to (referred to as the assigned drop zone) is visually distinguished over other drop zones. FIG. 14 provides one example of this. In FIG. 14, the drag input has selected scheduling indicator 360 in respect of "Story 3.2" (the focal task). At the start of the drag input the focal task was assigned to the "Sprint F" iteration (as depicted in FIG. 3), and, therefore, originally positioned at drop zone 602D. The drag input as dragged the scheduling indicator to the left form its original position (drop zone 602D) to a position overlapping drop zone 602B. As the focal task is assigned to the "Sprint H" iteration, drop zone 602D (corresponding to that iteration) is displayed in a currently assigned drop zone appearance (in this example having a solid outline). In the currently assigned drop zone appearance (e.g., 602D in FIG. 14) is different to each of the available drop zone appearance (e.g., 602C in FIG. 14), the unavailable drop zone appearance (e.g., 602E in FIG. 14), and the target drop zone appearance (e.g., 602B in FIG. 14). Once again, alternative means for visually distinguishing the types of drop zones are possible.

At 1304B, application 132 also alters the cursor graphic. This is the same or similar to 704B described above.

At 1304C, application 132 also attempts to identify a target iteration based on the current drag position. This is similar to 704C described above. If a target iteration is identified, application 132 visually distinguishes the target drop zone (1304C, which is the same or similar to 704C described above) and visually distinguishes a target iteration marker (1304D, which is the same or similar to 704D described above).

In the example of FIG. 14, application 132 has identified the "Sprint F" iteration as the target iteration, and, accordingly, has visually distinguished target drop zone 602B and iteration marker 348B.

As with process 700 described above, as the drag input is received—e.g., input dragging the scheduling indicator within (or in proximity to) the focal task's timeline—application 132 continues to process the input to determine whether there is a change to the target drop zone, and, if so, update the timeline GUI accordingly.

At 1306, application 132 detects a drop input (e.g., per 706 described above). The drop input is associated with a drop position.

At 1308, application 132 determines if the drop input (or the drop position thereof) is associated with a target iteration. This may be the same as (or similar to) operation 708 described above. If the drop input is associated with a target iteration, processing proceeds to 1310. Otherwise, processing proceeds to 1314.

At 1310, application 132 reassigns the focal task to the target iteration. This may be the same as (or similar to) operation 710 described above.

Figure 15:
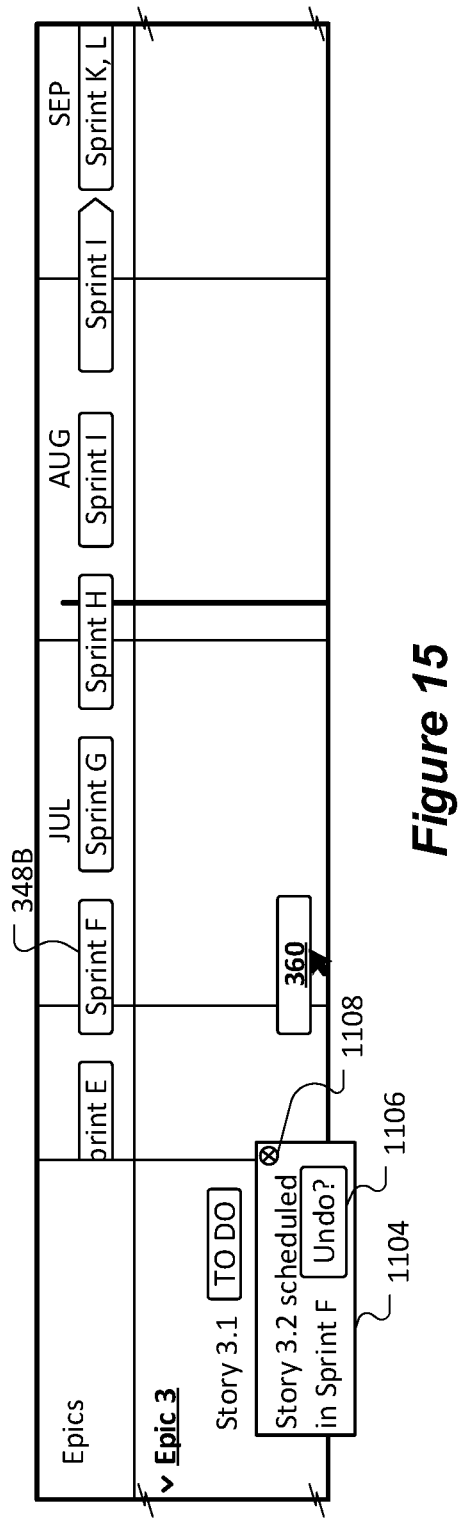

At 1312, application 132 updates the timeline GUI 300 to indicate that the task has been reassigned to the iteration. This may be the same as (or similar to) operation 712 described above. An example of this is depicted in FIG. 15, which depicts the task assignment that would occur if the drop input was received in GUI 300 of FIG. 14 (e.g., with "Sprint F" being the target iteration).

At 1314, the drop input is not associated with a target iteration. In this case application 132 does not assign the focal task to an iteration. At 1314, application 132 updates the timeline GUI 300. This may be the same as (or similar to) operation 714 described above, except that instead of simply ceasing to display the unassigned task indicator, application 132 instead (at 1314A) causes the scheduling indicator 360 of the focal task (e.g., the scheduling indicator 360 that the user input has been dragging) to be displayed in its original position (the position it was displayed in before detecting the drag input at 1302).

Figure 16:
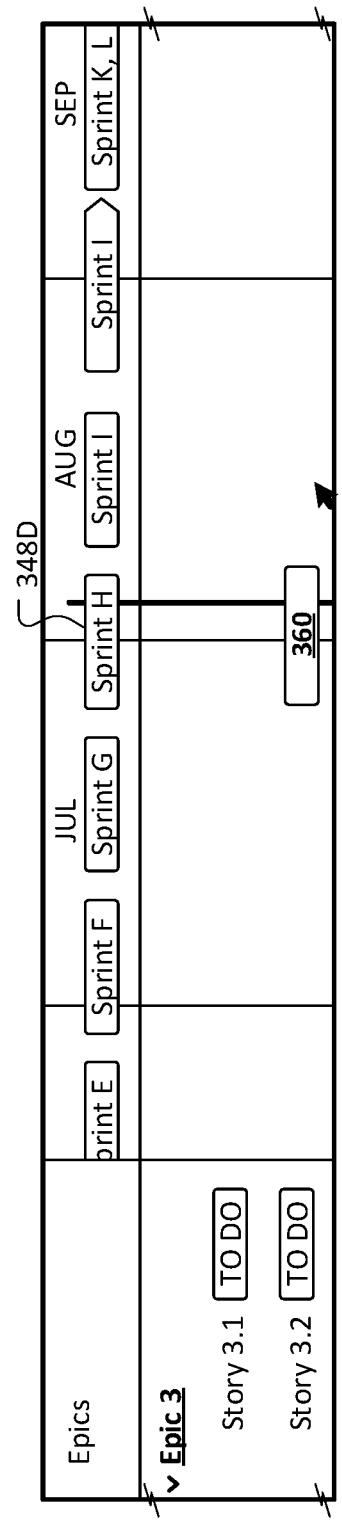

An example of this is depicted in FIG. 16, which depicts scheduling indicator 360 (in respect of the "Story 3.2" focal task) having returned to its original position (aligned with the "Sprint H" iteration marker 348D). This may occur, for example, if the drop input was received while the scheduling indicator 360 was positioned over (or substantially over) the unavailable drop zone 602E of FIG. 14. When displaying the scheduling indicator 360 in its original position application 132 may cause an animation to be displayed, which depicts the scheduling indicator moving from its location at the time of the drop input (e.g., its drop location) to its original location.

As described above, in certain implementations the server data received by the client application 132 at 402 defines separate components. In these implementations, operations the same as (or similar to) those described in processes 400, 700 and 1300 above may still be performed, however rather than being performed by a monolithic component (or application) they are performed by multiple components (or applications) operating together.

The following provides an example of this in which the client application 132 is a web browser application and the server data received at 402 defines a timeline component 134 and an iterations component 136. The timeline component 134 and iterations component 136 may, for example, be React components.

In the multi-component embodiments, the timeline component 134 controls generation of the timeline GUI. As such the timeline component 134 defines and controls most features of GUI 300 described above.

In addition, the timeline component 134 and iterations component 136 both subscribe to a shared context 142. Via the shared context 142, the timeline component 134 exposes a view of its internal state that can be consumed by other subscribes to the shared context 142—e.g., the iterations component 136 (and/or other components). More specifically, the timeline component 134 is configured to update the state in the shared context 142 when certain changes occur—for example: when a user hovers over a task timeline (e.g., at 406); when a user drags a task indicator (e.g., at 702 or 1302); and/or when other internal (timeline component) state changes occur. As a subscriber to the shared context 142 the iterations component 136 can consume and react to the shared context state and changes that are made thereto—e.g., by displaying additional GUI elements and/or causing task assignments to be created.

The following provides examples of how processes 400, 700, and 1300 as described above may be implemented in a multi-component context. In these examples, where the iterations component 136 is described as receiving data from the timeline component 134, this is achieved by the iterations component 136 reading data that the timeline component 134 publishes/writes to the shared context 142.

In the present multi-component example, the timeline data received at 402 is stored in the timeline component state store 138 and is used by timeline component 134 to display the other features of timeline GUI 300 (e.g., the list of tasks in the list region 310 and scheduling indicators 360). The iteration data received at 402 is stored in the iterations component state store 140 and is used by the iteration component 136.

In the present multi-component example, displaying the timeline GUI at 404 involves the iterations component 136 causing the timeline component 132 to display the iteration markers 348. This may, for example, be by a header extension display function/API that the timeline component 134 provides and which is used by the iterations component 136 to cause the timeline component 134 to display the iteration markers 348 in the header region 342. At 412 and 414 application 132 determines whether the focal task is an assigned task and, if so, whether the iteration a focal task is assigned to is currently displayed. In the present multi-component example, the iterations component 136 makes these determinations based on data received from the timeline component 134 (e.g., an identifier of the focal task and the currently displayed time period) and the iteration data (which will indicate whether a given task has been scheduled/assigned to a particular iteration or not, and, if so, the start/end dates of that iteration).

In the present multi-component example, displaying the iteration drop zones at 418 and 1304A involves the iterations component 136 causing the timeline component 134 to display the drop zones 602. Iteration component 136 determines the drop zones to be displayed (and whether a given drop zones is available or unavailable) based on data received from the timeline component 134 (e.g., the current time period displayed in the timeline GUI 300) and the iteration data (defining when iterations occur and which iterations are available/unavailable). The iterations component 136 then causes the timeline component 134 to display the iteration drop zones in the timeline GUI 300.

Over the course of the assign unassigned task process 700 and reassign task process 1300, the timeline component 134 continues to write certain data to the shared context 142. This allows the iterations component 136 to be aware of user inputs. For example, the assign unassigned task input at 702 and drag input at 1302 may both be drag state inputs which timeline component 134 shares via the shared context 142. The iterations component 136 reads data in respect of such user inputs from the shared context 142. The user input data received may be in terms of task identifiers and dates and/or input position data (e.g., x, y coordinates). With the user input data and the iteration data, iterations component 136 determines target drop zones (and target iteration markers) and, in response, causes the timeline component 134 to update the timeline GUI 300 accordingly. This may involve, for example, causing the timeline component 134 to display a new target drop zone (and new target iteration marker) and/or returning a previous target drop zone (and/or target iteration marker) to their "normal" appearance (e.g., at 704C/704D and 1304C/1304D).

By way of example, when an unassigned task indicator 802 or scheduling indicator 360 is being dragged, the timeline component 134 writes and/or shares data in respect of this user interaction in the shared context 142. The iterations component 136 reads this data and determines if the drag position of the task indicator 802/scheduling indicator 360 is overlapping one of the drop zone positions (these positions having been previously calculated in order to display the drop zones 602). If there is an overlap, the iterations component 136 causes the corresponding drop zone 602 (and its marker) to be highlighted.

Further, when the iterations component reads data from the shared context 134 that indicates an unassigned task indicator 802 or scheduling indicator 360 has been dropped (e.g., at 706 or 1306), the iterations component 136 determines if there is a viable target iteration (at 708 or 1308). If there is a viable target iteration, the iterations component 136 assigns the task to the iteration (at 710 or 1310, as described above), and in addition causes the timeline component 134 to update the timeline GUI (e.g., by ceasing to display drop zones, and reverting the target iteration marker to normal).

In the embodiments described above, application 132 causes a number of updates to the GUI timeline—e.g., at 704, 712, 714, 1304, 1312, and/or 1314. It will be appreciated that while these timeline GUI updates provide useful feedback to users not all of these updates need be implemented. By way of example, altering the cursor graphic (at 704B and 1304B) provides useful feedback that the user is now 'holding' a task and can drag the task to assign it. In some implementations, however, the cursor graphic may not be updated at 704B/1304B (or, therefore, need to be reverted to its 'normal' appearance at 712C/1312C/714C/1314C). As another example, distinguishing the target iteration marker (at 704D/1304D) provides additional feed back to the user as to the iteration the selected (focal) task would be assigned to if it was dropped in its current position. Once again, however, in alternative implementations this need not be done (nor, therefore, reverting a target iteration marker to its normal appearance at 712D/1312F/714D/1314D).

In the embodiments described above and the figures, various examples of how different types of GUI elements may be visually distinguished are provided. Alternative means for visually distinguishing GUI elements are possible. By way of example, techniques for visually distinguishing GUI elements may include one or a combination of: shading colours; shading patterns; line colours; line weights; line styles; transparencies; icons; character annotations; and/or other visual techniques.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense. For example, a first appearance could be termed a second appearance or vice versa without departing from the scope of the described examples. Furthermore, when used to differentiate elements or features, a second appearance could exist without a first appearance. For example, a second appearance could exist without a first appearance existing.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer implemented method comprising:
   receiving, from a server application, project data defining a plurality of tasks and a plurality of iterations;
   displaying, on a display, a first timeline graphical user interface (GUI) including a plurality of task timelines, each task timeline corresponding to one of the plurality of tasks, the first timeline GUI displays each task timeline without any of a set of drop zones;
   detecting a first user input proximate to a task timeline of the plurality of task timelines or proximate to a task of the plurality of tasks;
   in response to detecting the first user input, identifying a task associated with the first user input and in response to determining that the task is not assigned to any iteration of the plurality of iterations,
   causing display of a second timeline graphical user interface (GUI) including the plurality of task timelines causing the set of drop zones to appear in line with a timeline region of a task timeline of the plurality of task timelines, the set of drop zones including at least one available drop zone and at least one unavailable drop zone, the at least one available drop zone is displayed in a manner that is visually distinguishable from the at least one unavailable drop zone;
   causing display of an unassigned task indicator in the second timeline GUI, the unassigned task indicator comprising a movable graphical element corresponding to the task;
   in response to a second user input positioning the movable graphical element with respect to an available drop zone of the at least one available drop zones to which the task can be assigned, assigning the task to a respective iteration associated with the available drop zone; and
   in response to assigning the task to the respective iteration, causing display of a third timeline graphical user interface (GUI) including the plurality of task timelines and the assigned task, the task timeline displayed without any of the set of drop zones.

2. The computer implemented method of claim 1, wherein:
   a timeline component causes display of the second timeline GUI;
   the timeline component writes data to a shared context upon positioning of the unassigned task indicator with respect to the at least one available drop zone; and
   an iterations component subscribes to the shared context and causes the at least one available drop zone to be displayed based on the data written to the shared context by the timeline component.

3. The computer implemented method of claim 1, wherein:
   the unassigned task indicator being displayed at an initial position in the task timeline, the initial position indicating a particular iteration that the unassigned task can be assigned to.

4. The computer implemented method of claim 3, further comprising:
   detecting a drag input in respect of the unassigned task indicator, the drag input dragging the unassigned task indicator from the initial position to a drop position in the new task timeline;
   detecting a drop input in respect of the unassigned task indicator, the drop input dropping the unassigned task indicator at the drop position; and
   in response to detecting the drop input, determining whether the drop position corresponds to an available iteration; and
   in response to determining that the drop position corresponds to the available iteration:
   assigning the unassigned task to the available iteration; and
   displaying the unassigned task indicator at the drop position.

5. The computer implemented method of claim 4, wherein assigning the unassigned task to the available iteration comprises:
   generating a task assignment request including an identifier of the unassigned task and an identifier of the available iteration; and
   communicating the task assignment request to the server application.

6. The computer implemented method of claim 4, wherein in response to determining that the drop position does not correspond with any available iteration, the method further comprises displaying the unassigned task indicator at the initial position.

7. The computer implemented method of claim 6, wherein in response to determining that the drop position does not correspond with any available iteration, the method further comprises:

ceasing to display of the at least one available drop zone; or displaying an animation of the unassigned task indicator moving from the drop position to the initial position.

8. The computer implemented method of claim 4, wherein in response to determining that the drop position corresponds to the available iteration the method further comprises:

ceasing to display of the at least one available drop zone; or displaying an assignment confirmation indicating that the unassigned task has been assigned to the available iteration.

9. The computer implemented method of claim 8, wherein determining whether the drop position corresponds to the available iteration comprises determining whether the drop position is within a defined distance of the at least one available drop zone that corresponds to the available iteration.

10. The computer implemented method of claim 1, further including displaying an unavailable drop zone in the second timeline GUI, wherein the at least one unavailable drop zone corresponds to an iteration that the particular task cannot be assigned to.

11. The computer implemented method of claim 1, further comprising:

in response to determining that the task associated with the first user input assigned to an iteration of the plurality of iterations that is not displayed on the second timeline GUI:

removing visual display of the plurality set of drop zones; and displaying an off-screen assignment indicator.

12. A computer processing system comprising:

a processing unit;

a communication interface; and a non-transitory computer-readable storage medium storing instructions, which when executed by the processing unit, cause the processing unit to:

receive, from a server application via the communication interface, project data defining a plurality of tasks and a plurality of iterations;

cause display, on a display of a client device, a first timeline graphical user interface (GUI) including a plurality of task timelines, each task timeline corresponding to one of the plurality of tasks, the first timeline GUI displays each task timeline without any of a set of drop zones;

detect a first user input proximate to a task timeline of the plurality of task timelines proximate to a task of the plurality of task;

in response to the detected first user input, identify a task associated with the first user input and in response to determining that the task is not assigned to any iteration of the plurality of iterations, cause display of a second timeline GUI including the plurality of task timelines causing a set of drop zones to appear in line with a timeline region of a task timeline of the plurality of task timelines, the set of drop zones including at least one available drop zone and at least one unavailable drop zone, the at least one available drop zone is displayed in a manner that is visually distinguishable from the at least one unavailable drop zone;

cause display of an unassigned task indicator in the second timeline GUI, the unassigned task indicator comprising a movable graphical element corresponding to the task;

in response to a second user input positioning the movable graphical element with respect to an available drop zone of the at least one available drop zones to which the task can be assigned, cause assignment of the task to a respective iteration associated with the available drop zone; and in response to the task being assigned to the respective iteration, cause display of a third timeline GUI including the plurality of task timelines and the assigned task, the task timeline displayed without any of the set of drop zones.

13. The computer processing system of claim 12, wherein the instructions define a timeline component and an iterations component, and wherein:

the timeline component causes the second timeline GUI to be displayed;

the timeline component writes data to a shared context upon drop of the unassigned task indicator in the at least one available drop zone; and the iterations component subscribes to the shared context and causes the at least one available drop zone to be displayed based on the data written to the shared context by the timeline component.

14. The computer processing system of claim 12, wherein:

the unassigned task indicator displayed at an initial position in the task timeline, the initial position indicating a particular iteration that the unassigned task can be assigned to.

15. The computer processing system of claim 14, wherein execution of the instructions further causes the processing unit to:

detect a drag input in respect of the unassigned task indicator, the drag input dragging the unassigned task indicator from the initial position to a drop position in the particular task's timeline;

detect a drop input in respect of the unassigned task indicator, the drop input dropping the unassigned task indicator at the drop position;

in response to detecting the drop input, determine whether the drop position corresponds to an available iteration; and in response to determining that the drop position corresponds to the available iteration:

assign the unassigned task to the available iteration; and display the unassigned task indicator at the drop position.

16. The computer processing system of claim 15, wherein in response to determining that the drop position does not correspond with any available iteration, execution of the instructions further causes the processing unit to display the unassigned task indicator at the initial position.

17. The computer processing system of claim 16, wherein in response to determining that the drop position does not correspond with any available iteration, execution of the instructions further causes the processing unit to:

cease displaying the at least one available drop zone; or display an animation of the unassigned task indicator moving from the drop position to the initial position.

18. The computer processing system of claim 16, wherein in response to determining that the drop position corresponds to the available iteration, execution of the instructions further causes the processing unit to:
cease displaying the set of drop zones; or
display an assignment confirmation indicating that the unassigned task has been assigned to the available iteration.

19. The computer processing system of claim 18, wherein determining whether the drop position corresponds to the available iteration comprises determining whether the drop position is within a defined distance of the at least one available drop zone that corresponds to the available iteration.

20. The computer processing system of claim 12, wherein execution of the instructions further causes the processing unit to:
in response to determining that the task associated with the first user input assigned to an iteration of the plurality of iterations that is not displayed on the second timeline GUI:
remove visual display of the set of drop zones; and
display an off-screen assignment indicator.

\* \* \* \* \*